(12) United States Patent
Ganiger et al.

(10) Patent No.: US 12,173,845 B1
(45) Date of Patent: Dec. 24, 2024

(54) BEARING LUBRICATION SYSTEMS AND METHODS FOR OPERATING THE SAME

(71) Applicant: General Electric Company, Schenectady, NY (US)

(72) Inventors: Ravindra Shankar Ganiger, Bengaluru (IN); David Raju Yamarthi, Bengaluru (IN); Mandyam Rangayan Sridhar, Bengaluru (IN); Anand Madihalli Srinivasan, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/501,707

(22) Filed: Nov. 3, 2023

(30) Foreign Application Priority Data

Jul. 21, 2023 (IN) .............................. 202311049205

(51) Int. Cl.
    *F02C 7/06* (2006.01)
    *F16N 7/40* (2006.01)
    *F16N 29/00* (2006.01)
    *F16N 39/02* (2006.01)

(52) U.S. Cl.
    CPC ............... *F16N 7/40* (2013.01); *F16N 29/00* (2013.01); *F16N 39/02* (2013.01)

(58) Field of Classification Search
    CPC .................................. F16N 7/40; F16N 29/00
    See application file for complete search history.

(56) References Cited

U.S. PATENT DOCUMENTS

| | | | | |
|---|---|---|---|---|
| 3,135,211 A | * | 6/1964 | Pezzillo | F04D 13/0613 417/357 |
| 5,755,559 A | * | 5/1998 | Allington | G01N 30/28 73/861.43 |
| 6,047,541 A | * | 4/2000 | Hampsten | C06B 47/00 60/259 |
| 6,986,647 B2 | * | 1/2006 | Jones | F04D 13/0633 417/357 |
| 8,397,506 B1 | * | 3/2013 | Wright | F02C 1/10 415/110 |
| 9,315,757 B2 | * | 4/2016 | Thornton | A61M 5/3129 |

(Continued)

OTHER PUBLICATIONS

Gu et al., "A Review of Grooved Dynamic Gas Bearings," Applied Mechanics Reviews, vol. 72, dated Jan. 2020, 15 pages.

(Continued)

*Primary Examiner* — Michael A Riegelman
(74) *Attorney, Agent, or Firm* — HANLEY, FLIGHT & ZIMMERMAN, LLC

(57) ABSTRACT

Example bearing lubrication system and methods of operating the same are disclosed herein. An example closed loop system to provide a lubricant to a fluid pump includes a lubrication flow network disposed within the fluid pump; a sensor fluidly coupled to the fluid pump to measure a condition of a fluid that is to enter the lubrication flow network; a first transport bus fluidly coupled to the lubrication flow network, the first transport bus to transport an inert gas; a controller to actuate a valve fluidly coupled to the first transport bus, the controller to transmit signals to the valve based on the condition of the fluid to cause the valve to open or close; and a separator fluidly coupled between an outlet of the fluid pump and the first transport bus, the separator to separate the fluid and the inert gas.

20 Claims, 11 Drawing Sheets

(56) References Cited

U.S. PATENT DOCUMENTS

| | | | |
|---|---|---|---|
| 10,598,222 B2* | 3/2020 | Devitt | F16C 33/748 |
| 10,794,274 B2* | 10/2020 | Itoh | F02C 3/04 |
| 11,125,109 B2* | 9/2021 | Nayak | F02C 7/06 |
| 11,225,905 B1* | 1/2022 | Holley | F01K 23/02 |
| 11,530,705 B2* | 12/2022 | Beers | B64D 13/00 |
| 11,879,411 B2* | 1/2024 | Kumar | F02C 6/08 |
| 2014/0119881 A1* | 5/2014 | Kalra | F01D 11/04 |
| | | | 415/182.1 |
| 2015/0252944 A1* | 9/2015 | Kreutzkaemper | F16N 7/40 |
| | | | 184/7.4 |
| 2016/0208651 A1* | 7/2016 | Dolman | F16H 57/0475 |
| 2017/0254229 A1* | 9/2017 | Fletcher | F02C 1/105 |
| 2019/0218936 A1* | 7/2019 | Fomison | F16C 33/6659 |
| 2019/0249602 A1* | 8/2019 | Nayani | F16N 39/02 |
| 2020/0224557 A1* | 7/2020 | McAuliffe | F02C 6/08 |
| 2020/0295624 A1* | 9/2020 | Larson | F16N 7/40 |
| 2021/0013759 A1* | 1/2021 | Torrey | H02K 3/02 |
| 2021/0262386 A1* | 8/2021 | Kalevi Makela | F02C 7/12 |
| 2022/0056896 A1* | 2/2022 | Chang | B64G 1/401 |
| 2022/0074633 A1* | 3/2022 | Shu | F16N 7/40 |
| 2023/0279902 A1* | 9/2023 | Orkiszewski | F16C 27/02 |
| | | | 415/170.1 |
| 2023/0323835 A1* | 10/2023 | Kumar | F02C 7/12 |
| | | | 415/177 |
| 2023/0349511 A1* | 11/2023 | Rupprecht | F16N 7/38 |
| 2024/0125271 A1* | 4/2024 | Yamarthi | F02C 9/00 |
| 2024/0209778 A1* | 6/2024 | Raju | F04D 15/0011 |
| 2024/0229716 A1* | 7/2024 | Balbo | F01M 1/12 |
| 2024/0240570 A1* | 7/2024 | Ganiger | F01D 7/00 |

OTHER PUBLICATIONS

Briggs, "High Pressure Performance of Foil Journal Bearings in Various Gases," Proceedings of STLE/ASME International Joint Tribology Conference, Oct. 20-22, 2008, Miami, Florida, 3 pages.

Rehman et al., "Oil Mist Lubrication for Pumps and Electric Motors," Machinery Lubrication, Gear Talk with Wes Cash, retrieved from: https://www.machinerylubrication.com/Read/883/oil-mist-lubricated on Jun. 9, 2023, 14 pages.

Preuss, "Application of Hydrostatic Bearings in Supercritical CO2 Turbomachinery" The 5th International Supercritical CO2 Power Cycles Symposium, Mar. 29-31, 2016, San Antonio, TX, 10 pages.

* cited by examiner

BEARING LUBRICATION SYSTEMS AND METHODS FOR OPERATING THE SAME

RELATED APPLICATIONS

This application claims the benefit of Indian Provisional Patent Application No. 202311049205, which was filed on Jul. 21, 2023. Indian Provisional Patent Application No. 202311049205 is hereby incorporated herein by reference in its entirety. Priority to Indian Provisional Patent Application No. 202311049205 is hereby claimed.

FIELD OF THE DISCLOSURE

This disclosure relates generally to fluid pumps and, more particularly, to bearing lubrication systems and methods for operating the same.

BACKGROUND

Aircraft typically include various accessory systems to support operation of the aircraft and/or its gas turbine engine(s). For example, such accessory systems may include a lubrication system that lubricates components of the engine(s), an engine cooling system that provides cooling air to engine components, an environmental control system that provides cooled air to the cabin of the aircraft, and/or the like. As such, heat is added or removed from a fluid (e.g., oil, air, etc.) during operation of these accessory systems.

Figure 1:
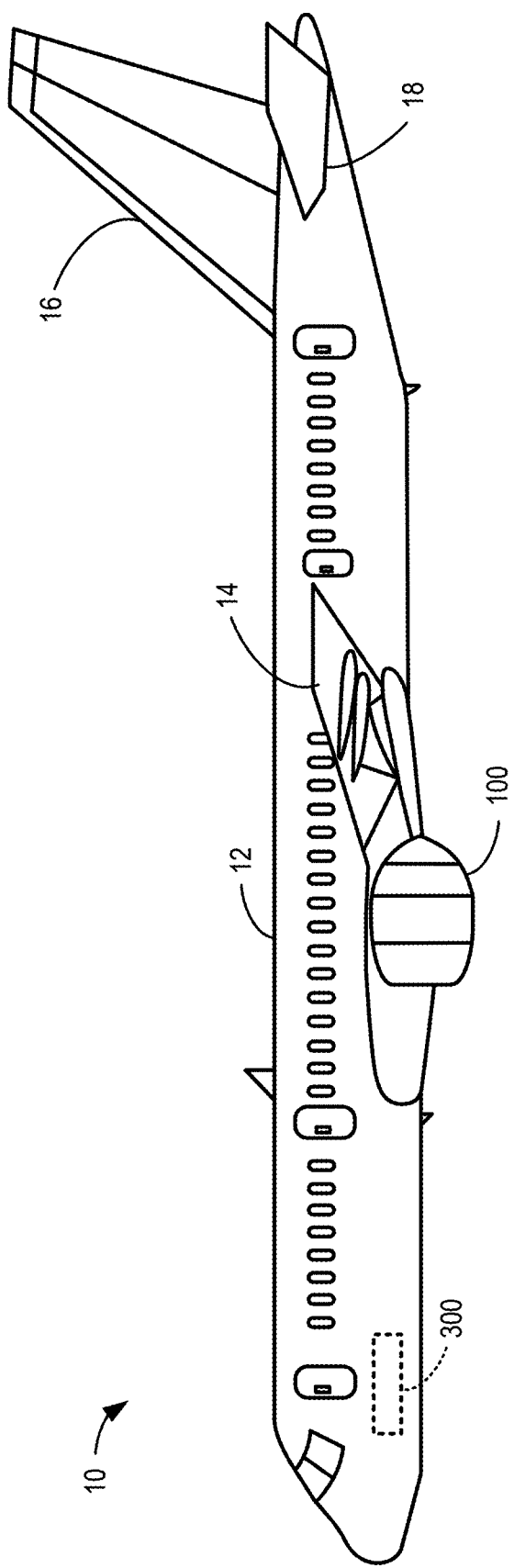
FIG. 1 is a side view of an example aircraft.

In general, the same reference numbers will be used throughout the drawing(s) and accompanying written description to refer to the same or like parts. The figures are not necessarily to scale. Instead, the thickness of the layers or regions may be enlarged in the drawings. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

DETAILED DESCRIPTION

As used herein, connection references (e.g., attached, coupled, connected, joined, detached, decoupled, disconnected, separated, etc.) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin. In some examples, an approximate temperature may be within 10 percent of the stated temperature.

In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, etc.).

The terms "forward" and "aft" refer to relative positions within a gas turbine engine, pump, or vehicle, and refer to the normal operational attitude of the gas turbine engine, pump, or vehicle. For example, with regard to a gas turbine engine, forward refers to a position closer to an engine inlet and aft refers to a position closer to an engine nozzle or exhaust. Further, with regard to a pump, forward refers to a position closer to a pump inlet and aft refers to a position closer to an end of the pump opposite the inlet.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, "radially" is used to express a point or points along a radial vector originating at a central axis of a rotating body and pointing perpendicularly outward from the central axis. In some examples, fluid is said to accelerate radially outward from an impeller, meaning that the fluid flows outward from a central axis (axis of rotation) of the impeller at a direction that is substantially orthogonal to the central axis.

As used herein, in the context of describing a state of a fluid (e.g., fluid carbon dioxide), the term "supercritical" and "supercritical state" describe a supercritical state whereby the fluid is at or above a critical temperature and critical pressure. In some examples, a fluid in a substantially supercritical state (e.g., whereby the fluid is at or within 5% of the critical temperature and at or within 5% of the critical pressure) is treated as a supercritical fluid.

The terms "state" and "phase" are used below to describe a form of matter (e.g., carbon dioxide). A state of matter refers to a form of matter at a given temperature and a pressure. A phase of matter refers to a set of equilibrium states demarcated in terms of state variables such as pressure and temperature. As discussed herein, the terms state and phase are used interchangeable to describe a form of a given portion of matter at a given moment. At a given temperature and pressure, a substance can exist mainly in one of four major states/phases of matter: solid, liquid, gas, and supercritical fluid. The term "non-liquid" is used below to describe fluid that is not in a liquid state/phase.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

To add or remove heat from a fluid (e.g., a heat transfer fluid, a working fluid, etc.), aircraft often include a thermal management system having a fluid pump coupled to one or more heat exchangers via a thermal transport bus (e.g., a conduit, flowpath, flowline, duct, etc.). During operation of the thermal transport system, the fluid (e.g., water, air, supercritical carbon dioxide ($sCO_2$), etc.) can absorb heat from a heat source(s) and/or transfer heat to a heat sink(s) such that the fluid absorbs heat from and/or transfers heat to the systems and/or components.

The fluid pump drives the fluid between the accessory systems and/or engine components. For example, a centrifugal fluid pump moves fluid by converting rotational kinetic energy of an impeller to hydrodynamic energy of a flowing fluid. The impeller is provided a change in rotational kinetic energy from an electric motor applying mechanical work to an impeller shaft coupled to the impeller and to a rotor (e.g., motor shaft) of the electric motor. The rotor can be coupled to the impeller shaft axially (e.g., via a magnetic coupling) and/or radially (e.g., via a gearing assembly, etc.). The rotor is provided a change in mechanical work over a period of time (i.e., mechanical power) from a stator in the electric motor applying electromagnetic forces to the rotor in the form of torque. In other words, the torque and angular velocity of the rotor is transferred to the impeller shaft, and ultimately, to the impeller. The impeller draws the fluid into an inlet of the fluid pump, accelerates the fluid radially through a compressor collector (e.g., a volute chamber, etc.), and drives the fluid to the thermal transport bus and/or another component through an outlet. As a result, axial loads (e.g., axial thrust, axial thrust loads, etc.) are imparted on the impeller towards an aft end of the pump.

During operation of the fluid pump, rotations of the impeller shaft and the impeller can cause the impeller shaft to radially vibrate within a housing(s) of the pump. To dampen the vibrations, the fluid pump employs radial bearings that support radial loads (e.g., weight) of the impeller shaft. In some examples, a portion of the working fluid is siphoned from the compressor collector and circulated through the pump to cool certain elements (e.g., motor(s), housing(s), etc.) and/or to support shaft bearings (e.g., axial thrust bearings, radial bearings, etc.). In some such examples, the impeller is a double impeller that includes expeller vanes on the aft side to draw the working fluid forward along the axis of rotation and back into the compressor collector. The working fluid within the pump housing(s) flows forward toward an aft side of the impeller along the shaft's axis of rotation. As a result, axial loads are imparted on the impeller towards a forward end of the pump.

The axial loads acting on the impeller can be unbalanced, meaning that an axial load acting toward a forward portion of the pump (e.g., a forward axial load or thrust) and an axial load acting toward an aft portion of the pump (e.g., an aft axial load or thrust) can be unequal. A forward or an aft axial thrust can cause the impeller shaft to shift along the central axis and cause parts coupled to the impeller shaft (e.g., impeller, rotor shaft, motor armature, etc.) to contact the housing(s), the motor, and/or other internal parts of the pump. To dampen the vibrations, the fluid pump employs an axial (e.g., thrust) bearing(s) that supports axial thrusts of the impeller shaft to reduce (e.g., inhibit, dampen, etc.) such axial movements of the shaft, reduce friction, improve performance of the pump, and reduce wear of components therein.

In some examples, the radial bearings and/or the axial thrust bearings are foil bearings (e.g., hydrodynamic bearings) that rely on a relatively thin hydrodynamic fluid film to support the load(s) and reduce friction between rotating elements within those bearings. A thickness of the hydrodynamic fluid film is affected by a fluid density, load, surface roughness, speed, operating temperature, pressure, diameter, etc. In some examples, the thickness varies between approximately 200 micro-inches to 5000 micro-inches based on application and conditions of operation. As noted above, a portion of the fluid that the fluid pump pressurizes in the thermal management system can be circulated through the fluid pump. For example, a lubricant transport bus can transfer the portion of the fluid to a secondary flow network within the fluid pump housing(s) that provides a path for the foil bearings to pressurize the lubricating film. Thus, the lubricant transport bus and the expeller vanes can implement a lubricating circuit from the pump and/or the thermal transport bus to the foil bearings and back to the expeller vanes to provide a continuous flow of the fluid to the foil bearings.

In some examples, the thermal management system uses supercritical carbon dioxide (e.g., $sCO_2$) as the heat exchange fluid due to its low viscosity and high specific heat, which makes $sCO_2$ more thermally conductive than other heat exchange fluids (e.g., water, air, etc.). Supercritical carbon dioxide is carbon dioxide held at or above a critical temperature and a critical pressure, allowing it to take on properties of a gas and a liquid, resulting in a low (e.g., gas-like) viscosity and high (fluid-like) density. Carbon dioxide has a relatively low critical pressure of approximately 74 bar (7.38 megapascals (MPa), 1073 pounds per square inch (psi)) and critical temperature of approximately 304.1 K (31° C., 87.8° F.). At or near the supercritical state, small changes in temperature or pressure of $CO_2$ can cause significant shifts in its density. The high density and volumetric heat capacity of $CO_2$ relative to other working fluids makes it more energy-dense, enabling a size reduction of one or components in a pump.

Displacements and vibrations of the shaft depend on conditions of the fluid film and on conditions of the foil bearings, which can change as a load acting on the foil bearings changes. Foil bearings include a spring-loaded foil lining, which provides a compliant, self-acting operating surface. The surface changes shape depending on a load, speed, thermal deformations, etc., to allow the bearing to accommodate levels of misalignment and thermal expansion. However, the foil bearings need to be provided with a lubricant having certain stiffness and damping properties to operate efficiently (e.g., to prevent bearing-contributed vibrations).

In some examples, such as during start-up and/or other low-speed conditions, a temperature and/or pressure of the $CO_2$ decreases such that at least some of the $sCO_2$ transitions to a liquid state. Performance of the foil bearings tend to decrease when working carbon dioxide is in a liquid phase. For example, a presence of liquid carbon dioxide can result in viscous draft (e.g., hydrodynamic drag, windage loss, etc.) generated from friction between the liquid and the shaft surface. In some examples, the liquid $CO_2$ causes issues with film thickness/stiffness, etc. For example, film stiffness can decrease as the gas film thickness increases. In some instances, foil bearing failure can result from a breakdown in the fluid film (e.g., a reduction in bearing clearance) separating the rotating component from the foil bearing. In some instances, a small change in the film thickness can result in a comparatively large reduction in a load carrying capacity of the foil bearing.

Further, due to the various operating conditions of the aircraft and the associated accessory systems, the temperature of the fluid can fluctuate in the lubricant transport bus and/or in the pump. The operating temperature of the $CO_2$ has a direct impact on a corresponding operating pressure of the $CO_2$, and vice versa. In addition, mechanical properties of $SCO_2$, such as viscosity and density, are dependent on the temperature and/or pressure of the fluid. As a result of the fluctuations in the temperature of the $sCO_2$, the radial loads acting on the shaft and/or thrust loads acting on the forward side and the aft side of the impeller can also fluctuate. At relatively high temperatures and pressures of the fluid (e.g., temperatures above approximately 350 degrees Fahrenheit (° F.) and pressures corresponding thereto), the properties of $sCO_2$ that affect the lubricating film can degrade (e.g., deteriorate), leading to vibrations. The vibrations cause decreased performance of the pump, and accelerate wear of the elements within the pump. Thus, while in some examples the foil bearings in the fluid pump can be designed to operate within a first temperature range (e.g., approximately 70° F.-500° F.), performance of the foil bearings can degrade when a fluid temperature is still within the first temperature range.

In other example, the foil bearings in the fluid pump can be designed to operate in within a second temperature range (e.g., approximately 70° F.-300° F.), while the fluid pump can be designed to operate within a third temperature range (e.g., approximately 150° F.-324° F.) that exceeds upper and/or lower boundaries of the second temperature range. In such instances, the working fluid used to lubricate the foil bearings can be associated with a temperature that exceeds an upper temperature limit (e.g., threshold) of the first temperature range, which can cause the foil bearing to increase in temperature past its upper temperature threshold. Operating the foil bearings beyond their upper temperature limit influences vibration characteristics (e.g. mode(s), etc.) of the fluid pump. In particular, the stiffness and damping of the foil bearings change, and the load capacity suffers. Thus, there is need to cool the working fluid below a certain temperature associated with the foil bearing(s) to prevent such overheating.

Based on at least the foregoing, there is a need to adjust a temperature and/or pressure of the working fluid during operation of the pump without compromising an efficiency of the foil bearing(s). A condition of the fluid can include a hot condition, a cold condition, etc. As used herein, a "hot condition" refers to an operating condition at which a temperature of the fluid satisfies (e.g., exceeds) a pre-defined upper temperature limit (e.g., threshold) (e.g., approximately 325° F.). In some examples, the upper temperature threshold corresponds to an upper operating temperature threshold of the foil bearings, the pump, and/or the fluid. As used herein, a "cold condition" refers to an operating condition at which a temperature of the fluid satisfies (e.g., exceeds) a pre-defined lower temperature limit (e.g., threshold) (e.g., approximately 150° F.). In some examples, the lower temperature threshold corresponds to a temperature(s) and corresponding pressure(s) at which the fluid can transition to a liquid state. As used herein, an operating condition corresponds to at least one of a rotational speed of the shaft, a temperature and/or pressure of the working fluid, and/or a level of vibration associated with and/or caused by the shaft and/or foil bearings.

Example bearing lubrication systems and methods for operating the same are disclosed herein. Disclosed bearing lubrication systems improve performance of load bearing components housed in a fluid pump. In particular, disclosed bearing lubrication systems facilitate control of a lubricant(s) (e.g., a fluid(s), hydrodynamic lubricating film, etc.) provided to the load bearing components based on an operating condition(s) of the fluid pump and/or a fluid being driven therethrough. Although examples disclosed herein are described with reference to a foil bearing(s) housed in the fluid pump, examples disclosed herein can be applicable to another load bearing component(s) housed in the fluid pump, such as another bearing(s), an impeller(s), etc.

Example bearing lubrication systems disclosed herein include a first transport bus (e.g., a lubricant transport bus) to a transport a fluid (e.g., working fluid, heat transfer fluid, a supercritical fluid such as $sCO_2$, etc.) siphoned from the fluid pump to a foil bearing(s) housed in the fluid pump. In particular, the pump drives the siphoned fluid through a secondary flow network to provide the fluid to the foil bearing(s). Further, the fluid is accelerated through a compressor collector of the pump and directed through a pump outlet. As a result, the fluid can be re-circulated through the lubricant transport bus to form a closed-loop lubrication circuit.

Example bearing lubrication systems disclosed herein include one or more sensors to determine an operating condition (e.g., characteristic, etc.) of the pump and/or the fluid being driven therethrough. In some examples, the bearing lubrication system can include a fluid sensor (e.g., a temperature sensor, a pressure sensor, etc.) positioned along the lubricant transport bus to determine an operating parameter of the fluid. For example, the bearing lubrication system includes a temperature sensor fluidly coupled to the lubricant transport bus to determine a temperature(s) of the fluid that is to enter a secondary inlet of the fluid pump. In some examples, the bearing lubrication system includes a vibration sensor (e.g., accelerometer(s), etc.) operatively coupled to the fluid pump and/or a component therein to determine vibration measurements. In some examples, the bearing lubrication system includes rotation sensor to determine a speed of a rotating component (e.g., a shaft(s), a rotor(s), an impeller(s), etc.) during operation. For example, at relatively high surface speeds, viscous shearing of the $CO_2$ generates heat, pushing bearing surface material to its operating temperature limits.

Example bearing lubrication systems disclosed herein include a second transport bus (e.g., a gas transport bus) to transport an inert gas to the foil bearing(s) housed in the fluid pump. During operation of the fluid pump, the gas transport bus can be used to inject the inert gas (e.g., krypton, argon, helium, xenon, dinitrogen, etc.) into the fluid pump to mix with the pressurized fluid and provide an immiscible fluid (e.g., an immiscible media, an immiscible mixture, an immiscible lubricant mixture, an immiscible gaseous mixture, an immiscible gaseous lubricant mixture, etc.) to the foil bearing(s) housed in the fluid pump. The addition of the inert gas to the fluid results in an immiscible lubricant mixture having a different temperature, critical pressure, viscosity, and/or density relative to the working fluid.

In some examples, the immiscible lubricant mixture provides improved hydrodynamic lubrication.

The gas transport bus can provide the inert gas to the foil bearings based detecting one or more operating conditions (e.g., speed(s), vibration level(s), pressure(s), fluid temperature(s), etc.). In some examples, the bearing lubrication system provides the inert gas when a temperature of the fluid satisfies an upper temperature threshold to reduce a temperature of a lubricant provided to the foil bearing(s). That is, the addition of the inert gas to the fluid can reduce a temperature of the fluid. In some examples, the bearing lubrication system provides the inert gas when a temperature of the fluid satisfies a lower temperature threshold to prevent or reduce liquid carbon dioxide from flowing through the foil bearing(s). The addition of the inert gas to the fluid can reduce a critical pressure of the fluid such that the carbon dioxide maintains a gaseous state at a lower temperature to ensure that non-liquid particles do not flow through the foil bearing(s).

In some examples, the bearing lubrication system provides the inert gas when a vibration level(s) associated with the fluid pump and/or components therein exceeds a pre-defined vibration threshold (e.g., limit). For example, the vibration level satisfying the vibration threshold can be indicative that the pump is operating in a hot condition or a cold condition. In some examples, the bearing lubrication system provides the inert gas when a speed of a rotating component(s) (e.g., a shaft, an impeller, etc.) satisfies a pre-defined upper rotation threshold (e.g., limit), which can be indicative that the pump is operating in a hot condition. In some examples, the bearing lubrication system provides the inert gas when a speed of a rotating component(s) satisfies a pre-defined lower rotation threshold (e.g., limit), which can be indicative that the pump is operating in a cold condition.

Example bearing lubrication systems disclosed herein include a separator(s) (e.g., a separation system) fluidly coupled to the lubricant transport bus and the gas transport bus at an outlet of the fluid pump to separate immiscible media exiting the pump. The separator can be, but is not limited to, a selective membrane separator (e.g., a graphene-based selective membrane, etc.), an oil/gas separator, a gas-liquid mixture separator, a gas-gas mixture separator, etc. The separator can be fluidly coupled to (a) the thermal transport bus and/or the first lubricant transport bus and (b) to the second lubricant transport bus. In some examples, the inert gas can be transported through the gas transport bus to an example inert gas additive chamber (e.g., gas cylinder, pressure vessel, etc.) fluidly coupled to the gas transport bus. As such, the inert gas can be re-circulated into a lubricating circuit to form a closed loop. Based on an operating condition, the fluid can be driven through the gas transport bus and re-injected immediately, or stored in the gas transport bus and/or the additive chamber.

In some examples, the bearing lubrication system includes an example valve fluidly coupled to the gas transport bus to control a flow of the inert gas exiting the pump. In some examples, the bearing lubrication system includes an example heat exchanger fluidly coupled to the gas transport bus. The inert gas exiting the heat exchanger can flow into the additive chamber (e.g., until the additive chamber is full, or partially full). In some examples, the valve is an expansion valve that controls an amount of inert gas released into the heat exchanger. For example, the expansion valve can remove pressure from the inert gas to allow expansion and advantageously affect cooling of the inert gas by the heat exchanger.

Disclosed herein are various configurations or arrangements of the bearing lubrication system. In some examples, the lubricant transport bus is fluidly coupled to the primary inlet of the fluid pump and to the outlet of the fluid pump. However, the lubricant transport bus can be fluidly coupled in different manners such that the lubricant transport bus can siphon a portion of the working fluid to provide to the secondary flow network. That is, the lubricant transport bus is to form a closed loop circuit to continuously provide fluid to the secondary flow network. In some examples, a downstream end of the gas transport bus is fluidly coupled to the secondary inlet of the fluid pump. In other examples, the downstream end of the gas transport bus is fluidly coupled to the lubricant transport bus prior to the secondary inlet. In still other examples, the downstream end of the gas transport bus is fluidly coupled to a portion of the pump such that the gas transport bus can provide an inert gas to the foil bearings and form a closed loop circuit.

Example bearing lubrication system disclosed herein enable simple, lightweight, and/or compact service tube design. Certain example enable improved foil bearing operation in high temperature/thermal environments. Certain examples enable manufacture and operation of a reliable foil bearing system that reduces vibrations during a hot condition(s) and reduces liquid carbon dioxide from entering the foil bearing(s) during a cold condition(s). Because bearing performance directly affects performance and operation of the pump, certain examples facilitate improved reliability of components of the fluid pump and operation of the pump itself. In some examples, the inert gas/$sCO_2$ composition enhances hydrodynamic performance of foil bearings housing in the pump due to changes density and viscosity for better foil gas bearing stiffness improved the hydrodynamic lubrication.

Furthermore, example systems disclosed herein can improve the operational efficiency of the pump (e.g., centrifugal $sCO_2$ pump) by minimizing or otherwise reducing frictional energy losses associated with axial impeller shaft movement. Furthermore, the example systems disclosed herein can increase the time between maintenance services to repair and/or replace component(s) of the thrust bearing(s), motor, pump, etc. Thus, certain examples enable more time on wing. The inert gas circuit is a closed-loop circuit, which reduces or eliminates a need to replace inert gas. For example, inert gas does not deteriorate like other substances, such as oil, and can be maintained clean in a closed loop for longer duration.

Examples are disclosed below in relation to a different types of centrifugal fluid pumps. However, in alternative examples, the fluid pumps may vary in number and/or type. For example, disclosed examples can be applied to applications for which a fluid state change may be needed during engine startup. While examples disclosed herein are applied to fluid pumps having fluid carbon dioxide as the working fluid, disclosed examples can be applied to other systems having other types of working fluids in additional or alternative examples such that the systems can achieve a critical temperature of the working fluid and the working fluid is associated with a critical pressure below a maximum pressure of the systems. For example, the working fluid can be nitrogen and/or other fluids for which a critical point to be achieved is reasonable in view of a given application.

Referring now to the drawings, wherein identical numerals indicate the same elements throughout the figures, FIG. 1 is a side view of one embodiment of an aircraft 10 that may implement the examples disclosed herein. As shown, in several embodiments, the aircraft 10 includes a fuselage 12 and a pair of wings 14 (one is shown) extending outward from the fuselage 12. In the illustrated embodiment, a gas turbine engine 100 is supported on each wing 14 to propel the aircraft through the air during flight. Additionally, as shown, the aircraft 10 includes a vertical stabilizer 16 and a pair of horizontal stabilizers 18 (one is shown). However, in alternative examples, the aircraft 10 may include any other suitable configuration, such as any other suitable number or type of engines, different types of engines and/or engines in different positions, etc.

Furthermore, the aircraft 10 may include a thermal management system 300 for transferring heat between fluids supporting the operation of the aircraft 10. More specifically, the aircraft 10 may include one or more accessory systems configured to support the operation of the aircraft 10. For example, in some examples, such accessory systems include a lubrication system that lubricates components of the engines 100, a cooling system that provides cooling air to components of the engines 100, an environmental control system that provides cooled air to the cabin of the aircraft 10, and/or the like. In such examples, the thermal management system 300 is configured to transfer heat to and/or from one or more fluids supporting the operation of the aircraft 10 (e.g., the oil of the lubrication system, the air of the cooling system and/or the environmental control system, and/or the like) from and/or to one or more other fluids supporting the operation of the aircraft 10 (e.g., the fuel supplied to the engines 100). However, in some other examples, the thermal management system 300 is configured to transfer heat between another fluid or component supporting the operation of the aircraft 10. In some examples, the thermal management system 300 defines or implements a primary flow network.

Although examples disclosed herein are described with reference to the aircraft 10 of FIG. 1, examples disclosed herein can be applicable to another type or configuration of aircraft that uses a thermal management system substantially similar to the thermal management system 300 of FIGS. 1-3. Thus, the present subject matter can be readily adaptable to another aircraft and/or another heat transfer application associated with another type of vehicle.

Figure 2:
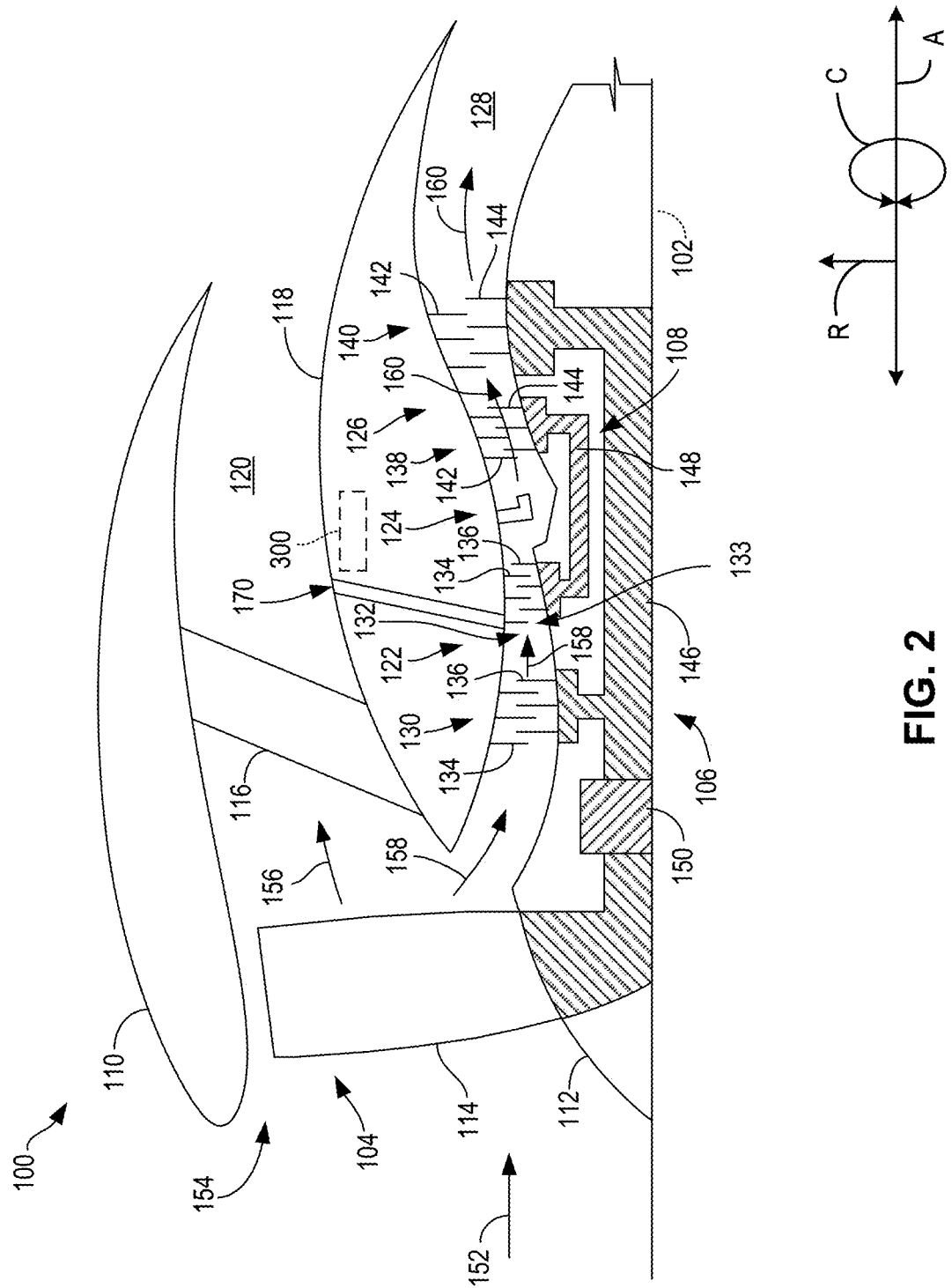
FIG. 2 is a schematic cross-sectional view of an example gas turbine engine of an aircraft.

FIG. 2 is a schematic cross-sectional view of an example gas turbine engine 100 (e.g., "engine"). In the illustrated example, the engine 100 is configured as a high-bypass turbofan engine. However, in some examples, the engine 100 is configured as a propfan engine, a turbojet engine, a turboprop engine, a turboshaft gas turbine engine, etc.

In general, the engine 100 extends along an axial centerline 102 and includes a fan 104, a low-pressure (LP) spool 106, and a high pressure (HP) spool 108 at least partially encased by an annular nacelle 110. More specifically, the fan 104 can include a fan rotor 112 and a plurality of fan blades 114 (one is shown) coupled to the fan rotor 112. In this respect, the fan blades 114 are circumferentially spaced apart and extend radially outward from the fan rotor 112. Moreover, the LP and HP spools 106, 108 are positioned downstream from the fan 104 along the axial centerline 102. As shown, the LP spool 106 is rotatably coupled to the fan rotor 112, which permits the LP spool 106 to rotate the fan blades 114. Additionally, a plurality of outlet guide vanes or struts 116 circumferentially spaced apart from each other and extend radially between an outer casing 118 surrounding the LP and HP spools 106, 108 and the nacelle 110. As such, the struts 116 support the nacelle 110 relative to the outer casing 118 such that the outer casing 118 and the nacelle 110 define a bypass airflow passage 120 positioned therebetween.

The outer casing 118 generally surrounds or encases, in serial flow order, a compressor section 122, a combustion section 124, a turbine section 126, and an exhaust section 128. In some examples, the compressor section 122 includes a low-pressure (LP) compressor 130 of the LP spool 106 and a high-pressure (HP) compressor 132 of the HP spool 108 positioned downstream from the LP compressor 130 along the axial centerline 102. Each compressor 130, 132 can, in turn, include one or more rows of compressor stator vanes 134 interdigitated with one or more rows of compressor rotor blades 136. As such, the compressors 130, 132 define a compressed air flow path 133 extending therethrough. Moreover, in some examples, the turbine section 126 includes a high-pressure (HP) turbine 138 of the HP spool 108 and a low-pressure (LP) turbine 140 of the LP spool 106 positioned downstream from the HP turbine 138 along the axial centerline 102. Each turbine 138, 140 can, in turn, include one or more rows of turbine stator vanes 142 interdigitated with one or more rows of turbine rotor blades 144.

Additionally, the LP spool 106 includes the low-pressure (LP) shaft 146 and the HP spool 108 includes a high-pressure (HP) shaft 148 positioned concentrically around the LP shaft 146. In such examples, the HP shaft 148 rotatably couples the turbine rotor blades 144 of the HP turbine 138 and the compressor rotor blades 136 of the HP compressor 132 such that rotation of the turbine rotor blades 144 of the HP turbine 138 rotatably drives the compressor rotor blades 136 of the HP compressor 132. As shown, the LP shaft 146 is directly coupled to the turbine rotor blades 144 of the LP turbine 140 and the compressor rotor blades 136 of the LP compressor 130. Furthermore, the LP shaft 146 is coupled to the fan 104 via a gearbox 150. In this respect, the rotation of the turbine rotor blades 144 of the LP turbine 140 rotatably drives the compressor rotor blades 136 of the LP compressor 130 and the fan blades 114.

In some examples, the engine 100 generates thrust to propel an aircraft. More specifically, during operation, air 152 enters an inlet portion 154 of the engine 100. The fan 104 supplies a first portion 156 of the air 152 to the bypass airflow passage 120 and a second portion 158 of the air 152 to the compressor section 122. The second portion 158 of the air 152 first flows through the LP compressor 130 in which the compressor rotor blades 136 therein progressively compress the second portion 158 of the air 152. Next, the second portion 158 of the air 152 flows through the HP compressor 132 in which the compressor rotor blades 136 therein continue to progressively compress the second portion 158 of the air 152. The compressed second portion 158 of the air 152 is subsequently delivered to the combustion section 124. In the combustion section 124, the second portion 158 of the air 152 mixes with fuel and burns to generate high-temperature and high-pressure combustion gases 160. Thereafter, the combustion gases 160 flow through the HP turbine 138 which the turbine rotor blades 144 of the HP turbine 138 extract a first portion of kinetic and/or thermal energy therefrom. This energy extraction rotates the HP shaft 148, which drives the HP compressor 132. The combustion gases 160 then flow through the LP turbine 140 in which the turbine rotor blades 144 of the LP turbine 140 extract a second portion of kinetic and/or thermal energy therefrom. This energy extraction rotates the LP shaft 146, which drives the LP compressor 130 and the fan 104 via the gearbox 150. The combustion gases 160 then exit the engine 100 through the exhaust section 128.

As mentioned above, the aircraft 10 may include a thermal management system 300 for transferring heat between fluids supporting the operation of the aircraft 10. In this respect, the thermal management system 300 may be positioned within the engine 100. For example, as shown in FIG. 2, the thermal management system 300 is positioned within the outer casing 118 of the engine 100. However, in alternative examples, the thermal management system 300 may be positioned at any other suitable location within the engine 100.

Furthermore, in some examples, the engine 100 defines a third-stream flow path 170. In general, the third-stream flow path 170 extends from the compressed air flow path 133 defined by the compressor section 122 to the bypass airflow passage 120. In this respect, the third-stream flow path 170 allows a portion of the compressed second portion 158 of the air 152 from the compressor section 122 to bypass the combustion section 124. More specifically, in some examples, the third-stream flow path 170 may define a concentric or non-concentric passage relative to the compressed air flow path 133 downstream of one or more of the compressors 130, 132 or the fan 104. The third-stream flow path 170 may be configured to selectively remove a portion of compressed second portion 158 of the air 152 from the compressed air flow path 133 via one or more variable guide vanes, nozzles, or other actuable flow control structures. In addition, as will be described below, in some embodiments, the thermal management system 300 may transfer heat to the air flowing through the third-stream flow path 170. However, a pressure and/or a flow rate of a fluid (e.g., a heat exchange fluid such as a supercritical fluid (e.g., $sCO_2$, etc.)) within the thermal management system 300 limits a rate at which thermal energy is transferred between the air and the heat exchange fluid. Additionally, it is advantageous for the thermal management system 300 to produce the pressure and/or the flow rate with components (e.g., pump systems) that minimize and/or otherwise reduce a physical size of the thermal management system 300 and/or the components (e.g., pump systems) included therein. Moreover, the thermal management system 300 may ensure that the heat exchange fluid is free of contaminants when thermal energy is to be transferred. Additionally, it is advantageous for the thermal management system 300 to produce the pressure and/or the flow rate with pumps that support axial thrusts of the shaft within the pump to improve the lifespan and/or efficiency of the pump(s) and the thermal management system 300.

Although examples disclosed herein are described with reference to the gas turbine engine 100 described above and shown in FIG. 2, examples disclosed herein can be applicable to another type or configuration of engine that uses a thermal management system substantially similar to the thermal management system 300 of FIGS. 1-3. Thus, the present subject matter can be readily adaptable to another engine and/or another heat transfer application associated with another type of vehicle.

Figure 3:
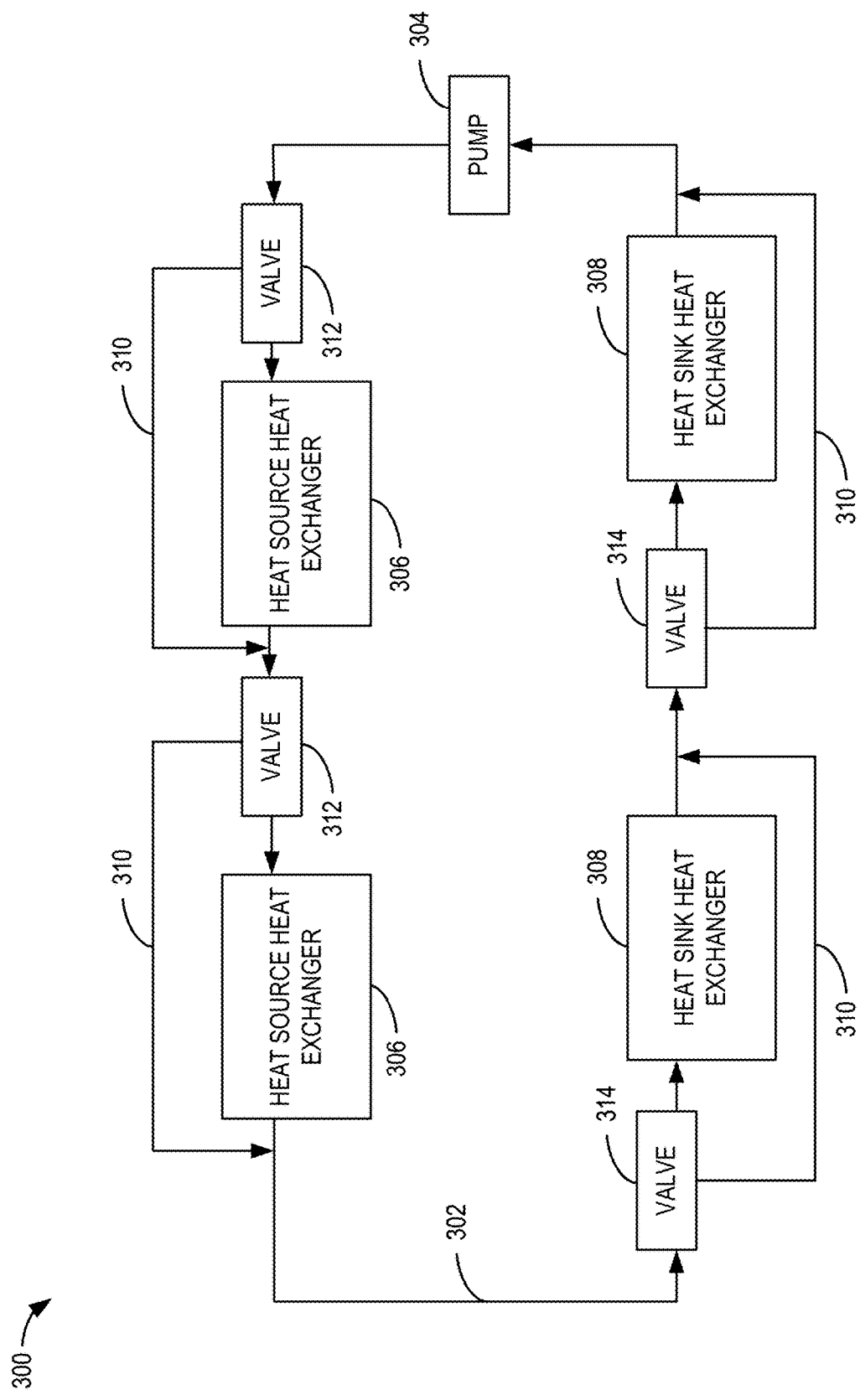
FIG. 3 is a schematic diagram of an example thermal management system for transferring heat between fluids.

FIG. 3 is a schematic view of an example implementation of the thermal management system 300 for transferring heat between fluids. In general, the thermal management system 300 will be discussed in the context of the aircraft 10 and the gas turbine engine 100 described above and shown in FIGS. 1 and 2. However, the disclosed thermal management system 300 may be implemented within another type of aircraft and/or another gas turbine engine of another configuration.

As shown, the thermal management system 300 includes a thermal transport bus 302. Specifically, in some examples, the thermal transport bus 302 is configured as one or more fluid conduits through which a fluid (e.g., a heat exchange fluid) flows. As described below, the heat exchange fluid flows through various heat exchangers such that heat is added to and/or removed from the heat exchange fluid. In this respect, the heat exchange fluid can be a working fluid, such as $sCO_2$, oil, liquid helium, etc. Moreover, in such examples, the thermal management system 300 includes a pump 304 configured to pump the heat exchange fluid through the thermal transport bus 302.

Additionally, the thermal management system 300 includes one or more heat source heat exchangers 306 arranged along the thermal transport bus 302. More specifically, the heat source heat exchanger(s) 306 is fluidly coupled to the thermal transport bus 302 such that the heat exchange fluid flows through the heat source heat exchanger(s) 306. In this respect, the heat source heat exchanger(s) 306 is configured to transfer heat from fluids supporting the operation of the aircraft 10 to the heat exchange fluid, which cools the fluids supporting the operation of the aircraft 10. Thus, the heat source heat exchanger(s) 306 adds heat to the heat exchange fluid. Although FIG. 3 illustrates two heat source heat exchangers 306, the thermal management system 300 can include a single heat source heat exchanger 306 or three or more heat source heat exchangers 306.

The heat source heat exchanger(s) 306 can correspond to many configurations of heat exchanger(s) that cool a fluid supporting the operation of the aircraft 10. In some examples, at least one of the heat source heat exchangers 306 is a heat exchanger(s) of the lubrication system(s) of the engine(s) 100. In such examples, the heat source heat exchanger(s) 306 transfers heat from the oil lubricating the engine(s) 100 to the heat transfer fluid. In some other examples, at least one of the heat source heat exchangers 306 is a heat exchanger(s) of the cooling system of the engine(s) 100. In such examples, the heat source heat exchanger(s) 306 transfers heat from the cooling air bled from the compressor section(s) 122 (or a compressor discharge plenum) of the engine(s) 100 to the heat transfer fluid. However, in some other examples, the heat source heat exchanger(s) 306 corresponds to other types of heat exchangers that cool a fluid supporting the operation of the aircraft 10.

Furthermore, the thermal management system 300 includes a plurality of heat sink heat exchangers 308 arranged along the thermal transport bus 302. More specifically, the heat sink heat exchangers 308 are fluidly coupled to the thermal transport bus 302 such that the heat exchange fluid flows through the heat sink heat exchangers 308. In this respect, the heat sink heat exchangers 308 are configured to transfer heat from the heat exchange fluid to other fluids supporting the operation of the aircraft 10, which heats the other fluids supporting the operation of the aircraft 10. Thus, the heat sink heat exchangers 308 remove heat from the heat exchange fluid. Although FIG. 3 illustrates two heat sink heat exchangers 308, the thermal management system 300 can include three or more heat sink heat exchangers 308.

The heat sink heat exchangers 308 can correspond to many configurations exchangers that heat a fluid supporting the operation of the aircraft 10. For example, at least of one of the heat sink heat exchangers 308 is a heat exchanger(s) of the fuel system(s) of the engine(s) 100. In such examples, the fuel system heat sink heat exchanger(s) 308 transfers heat from the heat transfer fluid to the fuel supplied to the engine(s) 100. In some other examples, at least one of the heat sink heat exchangers 308 is a heat exchanger(s) in contact with the first portion 156 of the air 152 flowing through the bypass airflow passage(s) 120 of the engine(s) 100. In such examples, the heat sink heat exchanger(s) 308 transfers heat from the heat exchange fluid to the first portion 156 of the air 152 flowing through the bypass airflow passage(s) 120.

In some examples, one or more of the heat sink heat exchangers 308 are configured to transfer heat to the air flowing through the third-stream flow path 170. In such examples, the heat sink heat exchanger(s) 308 is in contact with the air flow through the third-stream flow path 170. Thus, heat from the heat exchange fluid flowing through the thermal transport bus 302 can be transferred to the air flow through the third-stream flow path 170. The use of the third-stream flow path 170 as a heat sink for the thermal management system 300 provides one or more technical advantages. For example, the third-stream flow path 170 provides greater cooling than other sources of bleed air because a larger volume of air flows through the third-stream flow path 170 than other bleed air flow paths. Moreover, the air flowing through third-stream flow path 170 is cooler than the air flowing through other bleed air flow paths and the compressor bleed air. Additionally, the air in the third-stream flow path 170 is pressurized, which allows the heat sink heat exchanger(s) 308 to be smaller than heat exchangers relying on other heat sinks within the engine. Furthermore, in examples in which the engine 100 is unducted, using the third-stream flow path 170 (FIG. 2) as a heat sink does not increase drag on the engine 100 unlike the use of ambient air (e.g., a heat exchanger in contact with air flowing around the engine 100). However, in some other examples, the heat sink heat exchangers 308 correspond to other types of heat exchangers that heat a fluid supporting the operation of the aircraft 10.

Moreover, in some examples, the thermal management system 300 includes one or more bypass conduits 310. Specifically, as shown, each bypass conduit 310 is fluidly coupled to the thermal transport bus 302 such that the bypass conduit 310 allows at least a portion of the heat exchange fluid to bypass one of the heat exchangers 306, 308. In some examples, the heat exchange fluid bypasses one or more of the heat exchangers 306, 308 to adjust the temperature of the heat exchange fluid within the thermal transport bus 302. The flow of example heat exchange fluid through the bypass conduit(s) 310 is controlled to regulate the pressure of the heat exchange fluid within the thermal transport bus 302. In the illustrated example of FIG. 3, each heat exchanger 306, 308 has a corresponding bypass conduit 310. However, in some other examples, other numbers of heat exchangers 306, 308 can have a corresponding bypass conduit 310 so long as there is at least one bypass conduit 310.

Additionally, in some examples, the thermal management system 300 includes one or more heat source valves 312 and one or more heat sink valves 314. In general, each heat source valve 312 is configured to control the flow of the heat exchange fluid through a bypass conduit 310 that bypasses a heat source heat exchanger 306. Similarly, each heat sink valve 314 is configured to control the flow of the heat exchange fluid through a bypass conduit 310 that bypasses a heat sink heat exchanger 308. In this respect, each valve 312, 314 is fluidly coupled to the thermal transport bus 302 and a corresponding bypass conduit 310. As such, each valve 312, 314 can be moved between fully and/or partially opened and/or closed positions to selectively occlude the flow of heat exchange through its corresponding bypass conduit 310.

The valves 312, 314 are controlled based on the pressure of the heat exchange fluid within the thermal transport bus 302. More specifically, as indicated above, in certain instances, the pressure of the heat exchange fluid flowing through the thermal transport bus 302 can fall outside of a desired pressure range. When the pressure of the heat exchange fluid is too high, the thermal management system 300 can incur accelerated wear. In this respect, when the pressure of the heat exchange fluid within the thermal transport bus 302 exceeds a maximum or otherwise increased pressure value, one or more heat source valves 312 open. In such examples, at least a portion of the heat exchange fluid flows through the bypass conduits 310 instead of the heat source heat exchanger(s) 306. Thus, less heat is added to the heat exchange fluid by the heat source heat exchanger(s) 306, which reduces the temperature and, thus, the pressure of the fluid. In some examples, the maximum pressure value is between 3800 psi and 4000 psi or less. In some examples, the maximum pressure value is between 2700 psi and 2900 psi, such as 2800 psi. In some other examples, the maximum pressure value is between 1300 psi and 1400 psi, such as 1400 psi. Such maximum pressure values generally prevent the thermal management system 300 from incurring accelerated wear.

In some examples, the maximum pressure value is set prior to and/or during operation based on parameters (e.g., materials utilized, pump 304 design, aircraft 10 design, gas turbine engine 100 design, heat exchange fluid, etc.) associated with the thermal management system 300. The example maximum pressure value can be adjusted relative to the pressure capacities of the thermal transport bus 302, the pump 304, the heat exchangers 306, 308, the bypass conduit(s) 310, and/or the valves 312, 314.

Conversely, when the pressure of the heat exchange fluid is too low, the pump 304 can experience operability problems and increased wear. As such, when the pressure of the heat exchange fluid within the thermal transport bus 302 falls below a minimum or otherwise reduced pressure value, one or more of the heat sink valves 314 open. In such examples, at least a portion of the heat exchange fluid flows through the bypass conduits 310 instead of the heat sink heat exchangers 308. Thus, less heat is removed from the heat exchange fluid by the heat sink heat exchangers 308, which increases the temperature and, thus, the pressure of the fluid. In some examples, the minimum pressure value is 1070 psi or more. In some examples, the minimum pressure value is between 1150 psi and 1350 psi, such as 1250 psi. In some other examples, the minimum pressure value is between 2400 psi and 2600 psi, such as 2400 psi. Such minimum pressure values are generally utilized when the heat exchange fluid is in a supercritical state (e.g., when the heat exchange fluid is carbon dioxide).

As such, the thermal management system 300 can be configured to operate such that the pressure of the heat transport fluid is maintained with a range extending between the minimum and maximum pressure values. In some examples, the range extends from 1070 psi to 4000 psi. Specifically, in one example, the range extends from 1250 psi to 1400 psi. In some other examples, the range extends from 2400 psi to 2800 psi.

Accordingly, the operation of the pump 304 and the valves 312, 314 allows the disclosed thermal management system 300 to maintain the pressure of the heat exchange fluid within the thermal transport bus 302 within a specified range of values as the thermal load placed on the thermal management system 300 varies.

Furthermore, the example pump 304 drives the flow of the heat exchange fluid through the thermal management system 300. In some examples, the thermal management system 300 includes one pump 304 or multiple pumps 304 depending on the desired flow rate, delta pressure across the pump 304, and/or the kinetic energy loss of the heat exchange fluid in the thermal transport bus 302. For example, the pump 304 can increase the output pressure head to accelerate the flow of the heat exchange fluid to a first flowrate. As the heat exchange fluid passes through the thermal transport bus 302, the example kinetic energy of the heat exchange fluid dissipates due to friction, temperature variations, etc. Due to the kinetic energy losses, the heat exchange fluid decelerates to a second flow rate at some point upstream of the pump 304. When the example second flow rate is below a desired operating flow rate of the heat exchange fluid, the pump 304 can either be of a different architecture that outputs a higher first flow rate, or one or more additional pumps 304 can be included in the thermal management system 300.

Figure 4:
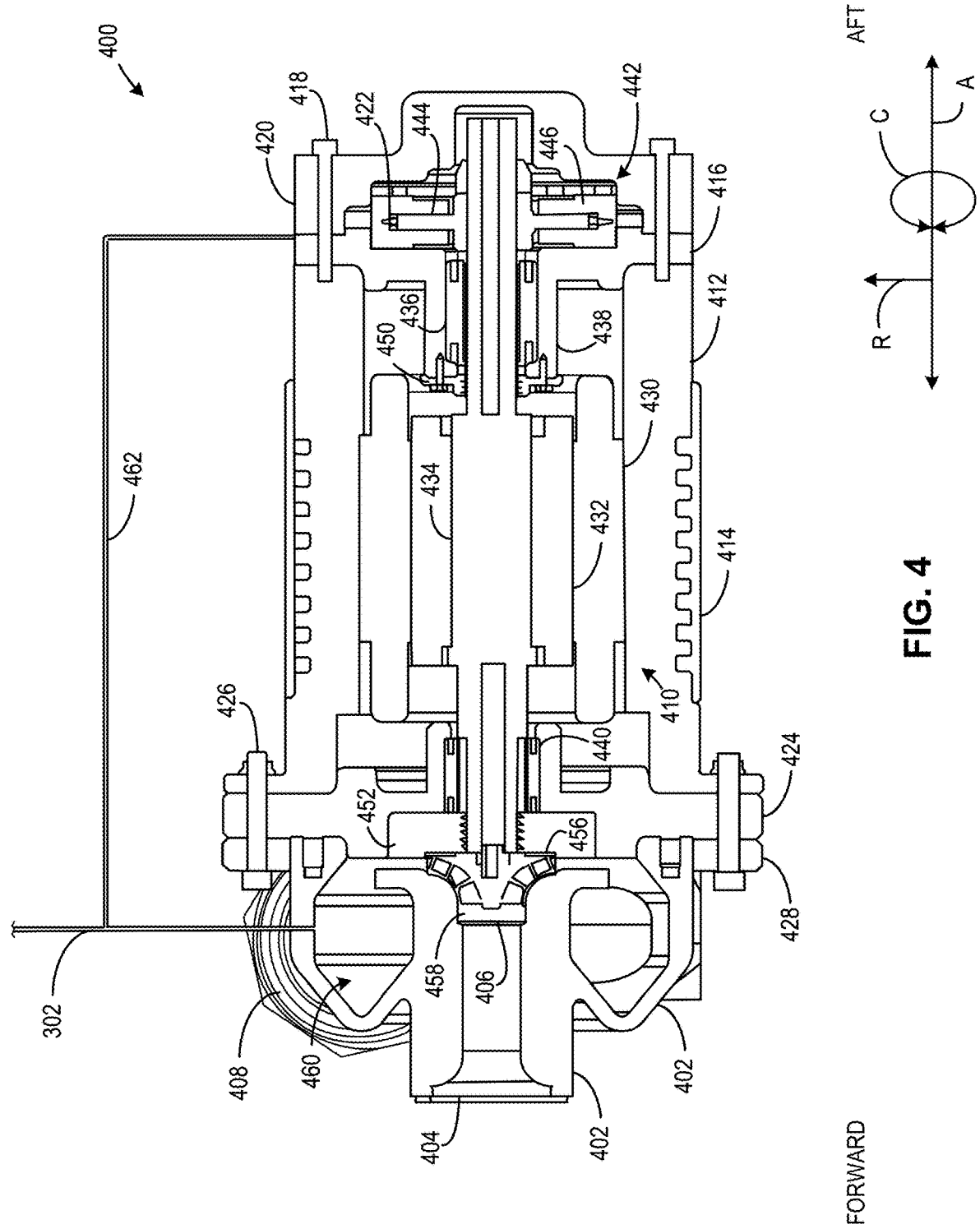
FIG. 4 is a schematic illustration of an example thermal transport bus pump.

FIG. 4 is a schematic illustration of an example thermal transport bus pump 400 (e.g., "pump", the fluid pump 304 of FIG. 3, an advanced Brayton cycle pump, an $sCO_2$ pump, etc.). In general, the pump 400 will be discussed in the context of the thermal management system 300 described above and shown in FIGS. 1-3. However, the disclosed pump 400 may be implemented within another type of fluid transport system of another configuration.

In the illustrated example of FIG. 4, the pump 400 drives a flow of a heat exchange fluid (e.g., "fluid"), such as $sCO_2$, through one or more fluid conduits 402. Specifically, the fluid flows through a primary inlet 404 and encounters an impeller 406 (e.g., a compressor wheel) that rotates to drive the fluid through a compressor collector 408 (e.g., a volute chamber) fluidly coupled to the fluid conduit(s) 402. In turn, the fluid conduit(s) 402 can feed the fluid to a first transport bus (e.g., the thermal transport bus 302 of FIG. 3, a primary transport bus, etc.) and, ultimately, to one or more heat exchangers (e.g., the heat exchanger 306, 308 of FIG. 3) and/or bypass conduits (e.g., the bypass conduits 310 of FIG. 3). Accordingly, the pump 400 can drive the heat exchange fluid to manage a thermal energy of working fluids associated with the aircraft 10 of FIG. 1, the gas turbine engine 100 of FIG. 2, and/or another system.

In the illustrated example of FIG. 4, the pump 400 includes a motor 410 positioned in a motor housing 412. In FIG. 4, the motor 410 is an induction motor operatively coupled to a variable frequency drive (VFD) and controlling circuitry (not shown), such as a full authority digital engine control (FADEC), that controls a rotational speed of the motor 410. For example, the controller circuitry can operate the motor 410 based on a pressure and/or a temperature of the heat exchange fluid in the fluid conduit(s) 402 and/or in the pump 400. In some examples, the controller circuitry can operate the motor 410 based on a pressure and/or a temperature of the working fluids affected by the heat exchange fluid. Additionally or alternatively, the controller circuitry can operate the motor 410 based on vibration measurements obtained by accelerometers operatively coupled to the pump 400 and/or the fluid conduit(s) 402.

In FIG. 4, the motor housing 412 is at least partially surrounded by a cooling jacket 414 to prevent the motor 410 from overheating. An aft end of the motor housing 412 is coupled to an aft bearing housing 416 via first bolts 418. Further, an end cap 420 is coupled to the aft bearing housing 416 via the first bolts 418. In some examples, a secondary inlet 422 can be defined in the aft bearing housing 416 and/or the end cap 420. The secondary inlet 422 can define an opening through which a lubricant(s) (e.g., the heat exchange fluid, an inert gas, etc.) is provided to a secondary flow network within the pump 400. A forward end of the motor housing 412 is coupled to a forward bearing housing 424 opposite the aft bearing housing 416 via second bolts 426. Moreover, the forward bearing housing 424 is coupled to a backplate 428 and the compressor collector 408 on an opposite side of the backplate 428 via the second bolts 426.

In the illustrated example of FIG. 4, the motor 410 of the pump 400 includes a stator 430 to induce alternating electrical currents in field coils and emit alternating magnetic fields about a central axis of the motor 410. The alternating magnetic fields interact with permanent magnets of a rotor 432 and, in turn, provide torque to the rotor 432. The rotor 432 is fixedly coupled to an impeller shaft 434 ("shaft"), and the shaft is fixedly coupled to the impeller 406. As such, the motor 410 drives a rotation of the shaft 434 and, in turn, a rotation of the impeller 406.

An aft end of the shaft 434 is supported by a first radial bearing 436 (e.g., shaft radial bearing), which is coupled to the aft bearing housing 416. In this example, the first radial bearing 436 is a foil bearing (e.g., a hydrodynamic bearing, etc.). The aft bearing housing 416 includes a bearing cup 438 that extends forward into the motor housing 412. In some examples, the first radial bearing 436 is coupled to the bearing cup 438 via an interference fit (e.g., a press fit), screws, or any other means for coupling that prevents at least a portion of the first radial bearing 436 from rotating in the bearing cup 438. As such, a portion of the fluid that flows through the secondary inlet 422 passes between the first radial bearing 436 and the shaft 434 as the fluid moves toward the forward end of the pump 400, as discussed in further detail below.

Similarly, a forward end of the shaft 434 is supported by a second radial bearing 440 coupled to the forward bearing housing 424 via an interference fit (e.g., a press fit), screws, or any other means for coupling that prevents at least a portion of the first radial bearing 436 from rotating in the forward bearing housing 424. In some examples, the first radial bearing 436 and/or the second radial bearing 440 can include spring-loaded foil journal linings that support radial loads of the shaft 434 during substantially low (e.g., startup) rotational speeds (e.g., 0-5,000 rotations per minute (rpm), etc.). When the motor 410 causes the shaft 434 to rotate at a substantially high (e.g., operational) rotational speed (e.g., 4000-20,000 rpm, etc.), a pressure of the working medium (e.g., $sCO_2$, etc.) increases and pushes the foil lining radially outward. Thus, the pressurized working medium supports the radial loads of the shaft 434 when the shaft 434 is rotating at operational speeds (e.g., 3000 rpm, 10,000 rpm, 25,000 rpm, etc.).

In the illustrated example of FIG. 4, the pump 400 includes an axial thrust bearing 442 (e.g., a thrust bearing) positioned aft of the first radial bearing 436. The axial thrust bearing 442 includes a thrust disc 444 clamped onto to the shaft 434 (e.g., via a spanner nut). Further, the axial thrust bearing 442 includes spring-loaded foil bearings 446 positioned around the thrust disc 444 to prevent or otherwise reduce axial movement of the shaft 434. For example, the foil bearings 446 can support axial loads of the shaft 434 via interactions with the thrust disc 444. In some examples, the axial thrust bearing 442 is coupled to the aft bearing housing 416 and/or the end cap 420 via bolts. In some examples, the foil bearing 446 is fixed to the aft bearing housing 416 and/or the end cap 420 via an interference fit or any other means for coupling that prevents a rotation of the foil bearing 446. In some examples, the axial thrust bearing 442 includes a forward thrust pad positioned forward of the thrust disc 444 and/or an aft thrust pad positioned aft of the thrust disc 444. For example, the thrust pads can be coupled to the aft bearing housing 416 and/or the end cap 420 and protrude radially inward toward the impeller shaft 434.

In the illustrated example of FIG. 4, a first labyrinth seal 450 is coupled to a forward end of the bearing cup 438 via screws or bolts. Similarly, a second labyrinth seal 452 is coupled to the forward bearing housing 424 via screws or bolts. The labyrinth seal(s) 450, 452 is positioned around the shaft 434 to help control a flow of the fluid in the motor housing 412. Specifically, a pressure differential on opposite sides of the labyrinth seal(s) 450, 452 prevents fluid from flowing past the respective labyrinth seal(s) 450, 452 towards an aft end of the pump 400. Instead, the labyrinth seal(s) 450, 452 enables the fluid that flows between the first radial bearing 436 and the shaft 434 to continue to flow towards the forward end of the pump 400.

The impeller 406 of the pump 400 includes expeller vanes 456 (e.g., blades) on an aft portion of the impeller 406. In particular, the expeller vanes 456 (e.g., blades) extend radially outward from a body 458 of the impeller 406.

Further, the expeller vanes 456 extend between the aft side of the body 458 and the backplate 428. At operational speeds of the motor 410, the expeller vanes 456 cause the working fluid (e.g., $sCO_2$) to flow forward from the forward bearing housing 424, motor housing 412, etc.

In some examples, the thermal transport bus 302 diverges from a pump outlet 460 to provide $sCO_2$ as a working medium (e.g., $sCO_2$) to the other components of the thermal management system 300 (FIG. 3). In some examples, the pump 400 includes an example lubricant transport bus 462 (e.g., a second transport bus, a secondary flowline, a lubrication flowline, etc.) that diverges from the pump outlet 460 to provide $sCO_2$ as a lubricant to the first and/or second radial bearings 436, 440, the axial thrust bearing 442, etc. Additionally or alternatively, the lubricant transport bus 462 can diverge from the fluid conduit 402, the thermal transport bus 302, and/or the expeller vanes 456. A downstream portion of the lubricant transport bus 462 can circumvent one or more of the motor housing 412, the aft bearing housing 416, the forward bearing housing 424, and/or the backplate 428 to access the foil bearings 436, 440, 446.

Figure 5:
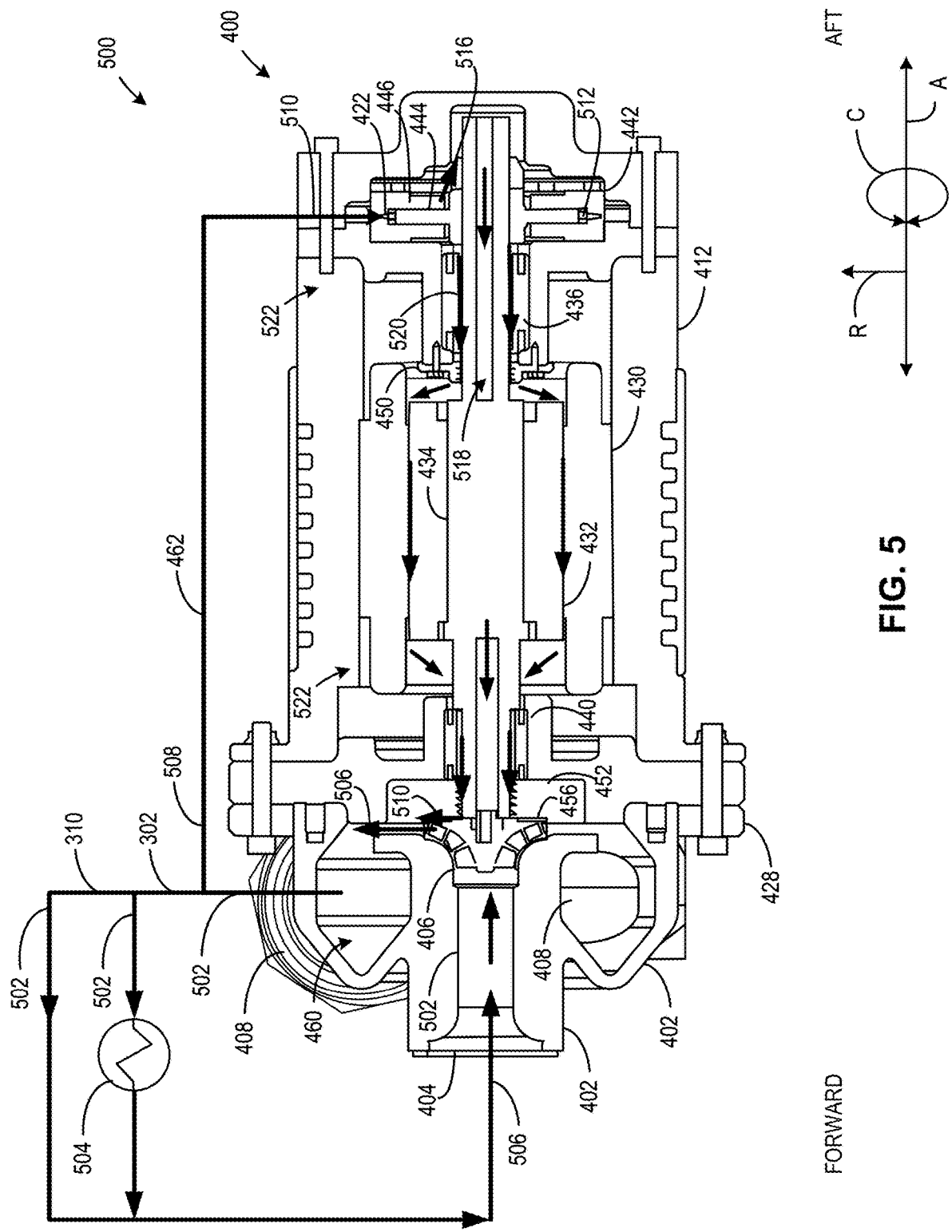
FIG. 5 is a flow diagram illustrating an example operation of the thermal transport bus pump of FIG. 4.

FIG. 5 illustrates an example fluid flow diagram 500 associated with the example thermal transport bus pump 400 of FIG. 4. While FIG. 5 is described in the context of the example thermal transport bus pump 400 of FIG. 4, it should be understood that aspects of the example fluid flow diagram 500 may be associated with other types of fluid pumps.

During operation, the impeller 406 rotates to compress and drive the fluid (e.g., $sCO_2$) radially outward between the compressor collector 408 and the backplate 428. In response to being driven through the pump outlet 460, a first portion 502 the heat exchange fluid is driven through the thermal transport bus 302 to one or more heat exchangers 504 (e.g., the heat source heat exchanger(s) 306 of FIG. 3, the heat sink heat exchanger(s) 308 of FIG. 3, etc.). In some examples, some of the first portion 502 of the heat exchange fluid bypasses the heat exchanger(s) 504 (e.g., via the bypass conduit 310 of FIG. 3). Further, after flowing through the one or more heat exchangers 504 and/or bypassing the heat exchangers 504, the first portion 502 of the heat exchange fluid enters the primary inlet 404 as a primary input fluid 506.

In response to being driven through the pump outlet 460, a second portion 508 of the heat exchange fluid is driven through a lubricant transport bus 462 that provides the second portion 508 to a secondary flow network in the pump 400. In some examples, an amount of the second portion 508 of the heat exchange fluid relative to the first portion 502 of the heat exchange fluid is dependent on operating conditions of the pump 400. In some examples, for example, the second portion 508 can account for approximately 0.5% to 50% of the heat exchange fluid flowing through the thermal management system 300.

Thus, the second portion 508 of the heat exchange fluid can form a secondary input fluid 510 that re-enters the pump 400 through the secondary inlet 422. For example, the axial thrust bearing 442 can be positioned in a bearing house 512 having an opening (e.g., a hole, slot, port, etc.) to permit the secondary input fluid 510 to enter the bearing house 512. Accordingly, the secondary input fluid 510 flows between the thrust disc 444 and the foil bearings 446 and becomes pressurized on forward and aft sides of the thrust disc 444 to bear axial loads of the shaft 434. That is, the thrust bearing 442 works by having a film of fluid separating the sliding surface (e.g. the shaft 434) from the bearing surface (e.g., the foil bearing 446). The pressure develops in this film when the fluid film is squeezed by the sliding surface over the stationary surface in the direction of rotation. The fluid film provides stiffness and damping to the axial thrust bearing 442.

In some examples, a first portion 516 the secondary input fluid 510 flows towards the aft end of the pump 400. A pressure in the pump 400 can cause the first portion 516 the secondary input fluid 510 to flow through a bore 518 of the shaft 434 towards the forward end of the pump 400. Further, a forward portion of the shaft 434 can include a conduit that carries the first portion 516 of the secondary input fluid 510 out of the motor housing 412 between the impeller 406 and the backplate 428. During operation, the expeller vanes 456 on the aft portion of the impeller 406 rotate and cause the secondary input fluid 510 to flow forward. In turn, the expeller vanes 456 can drive the secondary input fluid 510 radially outward between the impeller 406 and the backplate 428.

In the illustrated example of FIG. 5, a second portion 520 of the secondary input fluid 510 flows towards the aft end of the pump 400 in response to entering the motor housing 412 through the secondary inlet 422. As such, the second portion 520 of the secondary input fluid 510 flows between the first radial bearing 436 and the shaft 434. Furthermore, the first labyrinth seal 450 enables the second portion 520 of the secondary input fluid 510 to pass through and flow towards the forward end of the pump 400.

In turn, the second portion 520 of the secondary input fluid 510 can flow between the rotor 432 and the stator 430 of the motor 410. Further, the second portion 520 of the secondary input fluid 510 flows between the second radial bearing 440 and the shaft 434. Moreover, the second labyrinth seal 452 enables the second portion 520 of the secondary input fluid 510 to pass towards the forward end of the pump 400. As such, the second portion 520 of the secondary input fluid 510 can mix with the first portion 516 of the secondary input fluid 510 between the backplate 428 at the aft side of the impeller 406.

In turn, the expeller vanes 456 can drive the secondary input fluid 510 radially outward between the impeller 406 and the backplate 428. Accordingly, the secondary input fluid 510 can mix with the primary input fluid 506 and be driven through the pump outlet 460. The fluid flow diagram 500 of FIG. 5 represents an example secondary flow network 522 (e.g., a flow network, an internal flow network, a lubrication flow network, etc.) housed in the pump 400. The secondary flow network 522 is structured to provide a lubricant(s), such as the heat exchange fluid the pump 400 pressurizes during operation, to the foil bearings 436, 440, 442, 446. In some examples, the thermal transport bus pump 400 utilizes fluid carbon dioxide as the heat exchange fluid. Carbon dioxide has a relatively low critical pressure of approximately 74 bar, a relatively low critical temperature of approximately 87.8° F., and is non-flammable and non-toxic. Supercritical carbon dioxide takes on properties of a gas and a liquid, resulting in a low (e.g., gas-like) viscosity and high (fluid-like) density, which is beneficial for hydrodynamic films generated at the foil bearings 436, 440, 446.

At pressures above its critical pressure, the carbon dioxide transitions from a liquid state to a supercritical state continuously occur as the temperature increases. Variations in temperature can lead to significant changes in the properties of the $sCO_2$, such as density, pressure, and viscosity. Due to the various operating conditions of the aircraft and the associated accessory systems, operating temperatures of the pressurized fluid can fluctuate in the lubricant transport bus and/or in the pump. For example, heat is applied to the fluid from components of the thermal management system 300 during operation. Further, a temperature and/or pressure of working carbon dioxide reduces while the pump 400 is powered down. Because changes in temperature or pressure cause significant shifts in the working fluid's operating parameters, such temperature fluctuations of the fluid influence the operational stability and efficiency of components within the pump 400. As discussed in greater detail below, an inert gas can be added to the working fluid to form an immiscible fluid having a reduced critical pressure (e.g., by approximately 25 bar (2.5 MPa, 363 psi) in some examples). In other words, example bearing lubrication systems disclosed herein introduce the inter gas into the secondary flow network 522 of the pump 400 to maintain operating stability of the pump 400.

Figure 6:
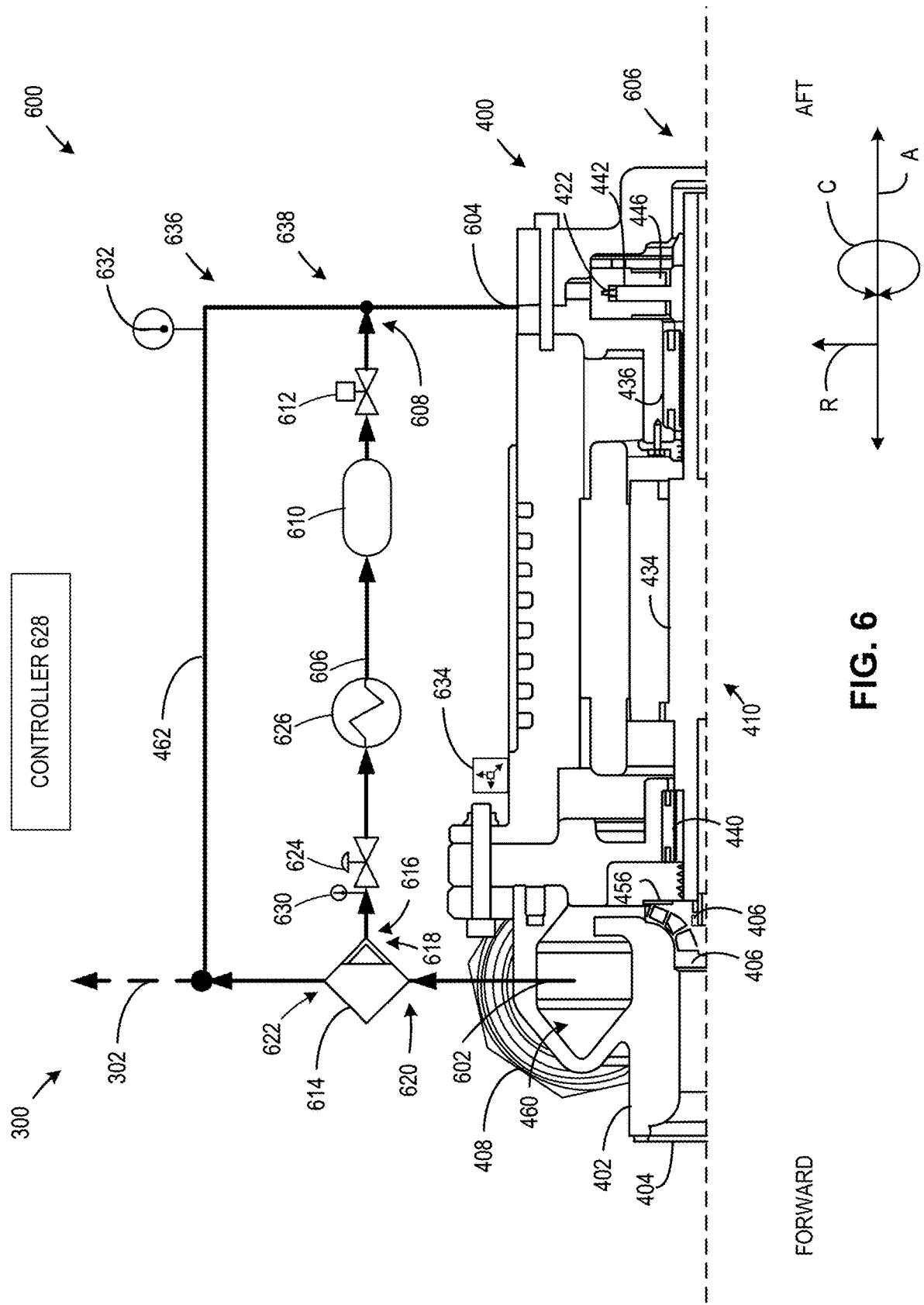
FIG. 6 is a schematic illustration of an example bearing lubrication system configured in accordance with teachings of this disclosure for providing a lubricant(s) to load bearing components in a pump.

FIG. 6 is a schematic illustration of an example bearing lubrication system 600 structured in accordance with teachings of this disclosure to facilitate control of a lubricant that is provided to a secondary flow network of a thermal transport pump. In general, the bearing lubrication system 600 will be discussed in the context of the thermal transport bus pump 400 described above and shown in FIGS. 4 and 5. In particular, the bearing lubrication system 600 of FIG. 6 is coupled to or otherwise integrated with the thermal transport bus pump 400. However, the disclosed bearing lubrication system 600 may be implemented within another type of pump of another configuration, such as another fluid pump that utilizes a working fluid to lubricate a rotating component during operation. In the example of FIG. 6, the working fluid is carbon dioxide. As used hereinafter, a pump system refers to a system including (but not limited to) the pump 400, components therein, the lubricant transport bus 462, and/or the working fluid.

FIG. 6 includes arrow lines between various components. The arrow lines represent any type of fluid connection, such as a transport bus, a conduit, fluid line, a hose, a tube, a connector, a port, and/or other structure or opening that fluidly couples two components. Therefore, any two components with an arrow between them can be considered fluidly coupled. FIG. 6 also includes circles that represent nodes or joints where one or more fluid paths connect. These nodes or joints can include any type of fluid line, hose, connector, port, etc. These arrow lines and nodes are similarly used in connection with another example bearing lubrication system 700 disclosed in further detail in conjunction with FIG. 7.

The bearing lubrication system 600 of FIG. 6 includes the lubricant transport bus 462 (e.g., the second transport bus), which is structured to provide $sCO_2$ as a lubricant to the foil bearings 436, 440, 442, 446. In the illustrated example of FIG. 6, an upstream end 602 (e.g., a first end, etc.) of the lubricant transport bus 462 is fluidly coupled to the pump outlet 460. In additional or alternative examples, the thermal transport bus 302 of FIGS. 3-5 and/or another conduit can extend from, and be fluidly coupled to, the pump outlet 460. In some such examples, the upstream end 602 of the lubricant transport bus 462 can be fluidly coupled to the thermal transport bus 302 and/or the other conduit to obtain a portion of the working fluid (e.g., $CO_2$, $sCO_2$, etc.).

A downstream end 604 (e.g., a second end, etc.) of the lubricant transport bus 462 is fluidly coupled to the secondary inlet 422 of the pump 400. As such, the lubricant transport bus 462 can provide $sCO_2$ to the secondary flow network 522 (FIG. 5) housed within the pump 400. The pump 400 includes the secondary flow network 522, which includes flowpaths through the pump 400 as discussed in relation to FIG. 5 to retain (e.g., hold, keep, etc.) and/or transport (carry, move, channel, etc.) the working fluid to the foil bearings 436, 440, 442, 446 for lubrication and hydrodynamic support (e.g., fluid pressure support). Thus, the working fluid enters in the secondary flow network 522 from the lubricant transport bus 462 and flows into the thrust bearing 442 via the secondary inlet 422 to lubricate and support the foil bearings 436, 440, 442, 446. That is, the impeller 406 and expeller vanes 456 draw the fluid forward, through the first radial bearing 436 and the second radial bearing 440, and drive the fluid through the pump outlet 460.

In some examples, the pump 400 is associated with an inlet temperature range, which includes temperatures between a lower inlet temperature threshold (e.g., approximately 150° F.) and an upper inlet temperature threshold (e.g., approximately 324° F.). However, in some instances, the upper inlet temperature threshold can be higher than an upper bearing temperature threshold (e.g., approximately 300° F.) associated with one or more foil bearings 436, 440, 442, 446 housed in the pump 400. Operating the foil bearing(s) 436, 440, 442, 446 above its respective upper bearing temperature threshold can reduce performance of the foil bearing(s) 436, 440, 442, 446 and lead to vibrations. Further, when the working fluid exceeds certain temperatures and corresponding pressures during operation, properties that facilitate efficient bearing lubrication can deteriorate, which can lead to vibrations. For example, at some temperatures, the density of the $sCO_2$ can degrade, resulting in deteriorated stiffness of the lubricating film. As such, the foil bearings 436, 440, 442, 446 can experience low performance, leading to vibrations of the shaft 434, the motor 410, and/or the pump 400.

The bearing lubrication system 600 includes an example second (e.g., gas, additive, etc.) transport bus 606 (e.g., conduit, flowline, etc.) ("gas transport bus") structured to transport an inert gas to the secondary flow network 522 based on an operating condition of the pump system. The inert gas can include one or more inert gas types, such as (but not limited to) krypton, argon, helium, xenon, and/or dinitrogen. In some examples, a type(s) of inert gas used is dependent on a specific application in which the bearing lubrication system 600 is to operate. In particular, the bearing lubrication system 600 injects the inert gas to form the immiscible lubricant mixture based on an operating condition of the fluid, the pump 400 and/or the motor 410 (as discussed in further detail below). The gas transport bus 606 is positioned between the pump outlet 460 and the secondary flow network 522. In the illustrated example of FIG. 6, a downstream end 608 of the gas transport bus 606 is fluidly coupled to lubricant transport bus 462 at or before to the secondary inlet 422. Thus, the bearing lubrication system 600 of FIG. 6 introduces an immiscible fluid mixture into the $sCO_2$ circuitry prior to the secondary inlet 422.

The addition of the inert gas to the fluid causes changes to operating properties of the fluid (e.g., temperature, pressure, viscosity, density, etc.). For example, during a hot condition (e.g., when the fluid satisfies or exceeds an upper operating threshold, such as approximately 300° F.), the addition of the inert gas lowers a temperature of the fluid and the immiscible mixture as a whole. In some examples, prior to entering the secondary flow network 522, the inert gas can be associated with a pressure of approximately 500 psi, but can be higher in other examples (e.g., between approximately 500 psi and 5,000 psi). A critical pressure of the fluid depends on a type of fluid. For example, a critical pressure of $CO_2$ is approximately 74 bar. Thus, the addition of the inert gas also reduces a critical pressure of the fluid. The reduction in the critical pressure of the fluid in response to the addition of the inert gas depends on a type, amount, and parameters (e.g., temperature, pressure, etc.) of the inert gas. In some examples, the addition of the inert gas can reduce the critical pressure of the fluid to/by approximately 25 bar. Thus, the fluid can maintain a gaseous state at a lower temperature. During a cold condition (e.g., during start-up and/or other low speed conditions), the addition of the inert gas can reduce the critical pressure such that the fluid is gaseous at a relatively low temperature to reduce or eliminate liquid particle content. In other words, the addition of the inert gas enables the bearing lubrication system 600 to maintain the fluid and/or the bearing temperature(s) within a desired range. Thus, the inert gas and sCCO$_2$ composition can enhance (e.g., improve) hydrodynamic performance of the foil bearings 436, 440, 442, 446 during hot and cold conditions.

The bearing lubrication system of FIG. 6 includes an example additive chamber 610 (e.g., gas cylinder, accumulator, pressure vessel, reservoir, etc.) fluidly coupled to the gas transport bus 606. The additive chamber 610 is structured to store (e.g., hold) at least a portion of an inert gas. The additive chamber 610 of FIG. 6 is a pressure storage reservoir in which the inert gas is held under pressure at a temperature to maintain its gaseous state. The additive chamber 610 of FIG. 6 includes a valve 612 fluidly coupled thereto. The fluid exiting the additive chamber 610 flows through the valve 612 to the lubricant transport bus 462. The inert gas mixes with the sCO$_2$ to form the immiscible fluid, which flows through the secondary flow network 522 and is driven through the pump outlet 460.

In some examples, the valve 612 is a check valve (e.g., a one-way valve, a back-flow preventer) that allows the gas fluids to flow in one direction (e.g., downstream), preventing flow from reversing. In some such examples, the additive chamber 610 relies on a pressure differential to generate flow of inert gas stored in the additive chamber 610, for example, in response to opening of an upstream valve. In some examples, the valve 612 pressure control valve, a flow control valve, etc., that opens or closes to regulate flow therethrough. The valve 612 can be closed to occlude flow of the inert gas into the gas transport bus 606, or the valve 612 can be opened (e.g., fully, partially, etc.) to allow flow of inert gas into to the secondary flow network 522.

In response to being ejected from the pump outlet 460, the inert gas needs to be separated from the CO$_2$ such that the inert gas does not flow through other components of the thermal management system 300. Thus, the bearing lubrication system 600 of FIG. 6 includes an example separator 614 (e.g., a separation system) positioned adjacent the pump outlet 460. The separator 614, which is structured to separate the inert gas and the sCO$_2$, is fluidly coupled to the to the lubricant transport bus 462 and/or the thermal transport bus 302. In particular, as illustrated in FIG. 6, an upstream end 616 of the gas transport bus 606 of FIG. 6 is fluidly coupled to a first outlet 618 (e.g., a gas outlet, a retentate outlet, etc.) corresponding to the separator 614.

During operation, the immiscible mixture exits the pump outlet 460 and flows into the separator 614 via a separator inlet 620. The separator 614 extracts or removes the inert gas from the immiscible mixture and directs the inert gas to the gas transport bus 606 through the first outlet 618. Further, the separator 614 directs remaining sCO$_2$ to the lubricant transport bus 462 and/or the thermal transport bus 302 via a second outlet 622 (e.g., an sCO$_2$ outlet, a permeate outlet, etc.) corresponding to the separator 614. In some examples, the separator 614 removes and directs liquid (e.g., liquid CO$_2$ and/or other liquid particles) to the lubricant transport bus 462 and/or the thermal transport bus 302 via the second outlet 622. As discussed in further detail below in conjunction with FIGS. 8-10, the bearing lubrication system 600 can include different types of separators 614. In some examples, the separator 614 is a graphene membrane. In some examples, the separator 614 is a membrane (e.g., an absorbent membrane, a permeable membrane, or the like) structured to absorb the inert gas. In some examples, the separator 614 is a membrane contactor (e.g., a permeable membrane that promote the contact between two phases) structured to absorb the inert gas. The membranes can act as a permeable barrier through which different compounds move across at different rates (e.g., or do not move at all). The membranes can be nanoporous, polymer, etc. and the gas molecules penetrate according to their size, diffusivity, and/or solubility.

The bearing lubrication system 600 of FIG. 6 includes another example valve 624 (e.g., an expansion valve, etc.) fluidly coupled to the gas transport bus 606 to control a flow of gas therethrough. In particular, the valve 624 is an in-line, thermally actuated valve positioned downstream of the separator 614. While the valve 624 is open, at least a portion of the inert gas can flow through the gas transport bus 606. Further, the bearing lubrication system 600 includes an example heat exchanger 626 fluidly coupled to the gas transport bus 606 downstream of the valve 624. In some examples, the pump 400 pressurizes the inert gas as it flows through the secondary flow network 522 and the compressor collector 408. Thus, the valve 624 reduces a pressure of the inert gas, which is then cooled by the heat exchanger 626.

In particular, the inert gas exits the separator 614 and flows to the valve 624, which has an adjustable opening through which a desired amount of the inert gas is metered to obtain advantageous cooling. The valve 624 can be mechanical, electrical, pneumatic, etc., or a combination thereof. The valve 624 can include a temperature sensor 630 to measure the temperature of the inert gas flow and, based on the temperature, selectively actuate between discrete positions to adjust a pressure of the CO$_2$ flow. The valve 624 may be externally actuated (e.g., by a controller, such as a controller 628) or may be self-actuated (e.g., a thermostatic valve having internal sensors and actuator(s)). For example, the valve 624 can transmit a temperature measurement to the controller 628 (discussed below), which can cause the valve 624 to selectively actuate based on the temperature measurement. In some examples, temperature sensor 630 can be internally coupled to an actuator that moves the valve 624 between the discrete positions based on the temperature of the inert gas flow.

The valve 624 controls the flow of the inert gas to reduce a pressure of the inert gas. The valve 624 located at the inlet of the heat exchanger 626 releases the inert gas into the heat exchanger 626, which absorbs heat from inert gas to cool the inert gas. That is, the heat exchanger 626 removes heat from the inert gas. The inert gas flows through the heat exchanger 626 and enters the additive chamber 610. Thus, the inert gas can be cooled and re-circulated through the secondary flow network 522 (FIG. 5).

In the illustrated example of FIG. 6, the bearing lubrication system 600 includes the controller 628 to operate the various devices and control the operation of the bearing lubrication system 600. The controller 628 can be an automatic and/or closed loop controller (e.g., proportional-integral-derivative (PLD) controller, full authority digital electronics controller (FADEC), etc.). The controller 628 is communicatively coupled to the valve(s) 612, 624, the heat exchanger 626, one or more sensors, and/or any other device that controls and/or monitors various parameters of the bearing lubrication system 600 via wired connections (e.g., Ethernet, coaxial, universal serial bus (USB), etc.) and/or wireless connections (e.g., Bluetooth, cellular, Wi-Fi, near field communication (NFC), etc.).

The bearing lubrication system 600 includes the one or more sensors to determine an operating condition of the pump system, such as (but not limited to) a condition of the fluid, the pump 400, and/or the motor 410. For example, the bearing lubrication system 600 of FIG. 6 includes an example fluid sensor(s) 632 to collect measurements of the fluid relative to the pump 400 during operation. In particular, the fluid sensor(s) 632 of FIG. 6 is a temperature sensor (e.g., a temperature gauge, etc.) to measure a temperature of the fluid.

In some examples, the bearing lubrication system 600 includes an example vibration sensor 634 to determine a level of vibration(s) associated with the pump 400 and/or components therein during operation. In this example, the vibration sensor 634 is an accelerometer. However, the vibration sensor 634 can be another type of sensor that can measure a vibration level associated with the pump 400, such as a gyroscope, a microphone, a strain gauge, laser displacement detector, etc. The vibration sensor 634 is to measure an operating vibration level of the pump 400 and/or a components therein during operation. In some examples, the bearing lubrication system 600 includes an example rotation sensor 635(e.g., a tachometer, a motor speed sensor, a shaft speed sensor, etc.) to measure a speed of the shaft 434 therein during operation. The rotation sensor 635 is to measure an operating speed of the shaft 434 housed in the pump 400. While not illustrated, the bearing lubrication system 600 can include a pressure sensor (e.g., a pressure gauge) to measure a pressure of the fluid, and/or another type of sensor to measure an operating condition of the pump system.

The controller 628 is structured to monitor the fluid to determine an operating condition of the pump system. The fluid sensor(s) 632 detects a temperature of the working fluid and transmits the temperature reading(s) to the controller 628. In turn, the controller 628 of FIG. 6 obtains an input signal (e.g., an electronic signal, etc.) from the fluid sensor (s) 632 indicative of an operating temperature of the fluid. Based on the operating temperature of the fluid, the controller 628 determines whether to add inert gas to the working fluid. For example, when the controller 628 detects an operating temperature of the fluid as exceeding an upper temperature threshold (e.g., approximately 300° F.), the controller 628 determines to add the inert gas. As illustrated in FIG. 6, the fluid sensor(s) 632 is positioned on the lubricant transport bus 462. However, the disclosed example is not limited thereto. Rather, the fluid sensor(s) 632 can be positioned in any suitable location such that a temperature of the fluid can be determined prior to entrance to the secondary inlet 422 and/or the secondary flow network 522. For example, the fluid sensor(s) 632 can be positioned adjacent the primary inlet 404 of the pump 400, another position on the lubricant transport bus 462, in a fluid conduit 402, etc.

The controller 628 compares the operating temperature obtained from the fluid sensor 632 to one or more thresholds to determine when to add the inert gas to the working fluid. The controller 628 of FIG. 6 compares the operating temperature of the fluid to an example lower temperature threshold (e.g., limit) to determine whether the operating temperature satisfies (e.g., exceeds, is lower than, etc.) the lower temperature threshold. For example, the operating temperate typically satisfies the lower temperature threshold (e.g., approximately 150° F.) during start-up of the pump 400 and/or engine 100, at which the fluid temperature can reach approximately −40° F. The operating temperature satisfying the lower temperature threshold can be indicative of a cold condition. The controller 628 of FIG. 6 also compares the operating temperature of the fluid to an example upper temperature threshold (e.g., limit) to determine whether the operating temperature satisfies (e.g., exceeds, is higher than, etc.) the upper temperature threshold (e.g., approximately 300° F.). For example, the fluid temperature can increase during operation of the pump, which can cause components in communication with the fluid to increase in temperature. The operating temperature satisfying the upper temperature threshold can be indicative of a hot condition.

The controller 628 of FIG. 6 controls (e.g., actuates) a core (e.g., plunger, disk, diaphragm, ball, globe, gate, etc.) of one or more of the valves 612, 624 to an opened position, a closed position, or a partially opened position based on sensor data obtained from the fluid sensor(s) 632. In response to detecting a threshold condition, the controller 628 is structured to cause the inert gas to enter the secondary flow network 522. The controller 628 sends an output signal (e.g., control signal, etc.) to the valve(s) 612, 624 representing a position of core that actuates the valve(s) 612, 624 to open/close. Further, the controller 628 continues to monitor an operating temperature of the fluid and, in response to determining the fluid no longer satisfies the threshold condition, sends an output signal to the valve(s) 612, 624 to occlude the inert gas.

Additionally or alternatively, the controller 628 can monitor another parameter of the fluid, the pump 400 and/or the motor 410 to determine an operating condition of the pump system. For example, the controller 628 can operate the valve(s) 612, 624 based on vibration measurements obtained by the vibration sensor 634. The vibration sensor 634 detects vibration level (e.g., value, measurement, etc.) and transmits a signal indicative of the vibration level to the controller 628. In turn, the controller 628 of FIG. 6 obtains an input from the vibration sensor 634 indicative of vibration level of the shaft 434, etc. Based on the vibration level, the controller 628 determines whether to add inert gas to the working fluid. In some examples, the vibration levels experienced by the shaft 434, etc. are dependent of design of the thermal management system 300, the pump 400 and components therein, operating conditions, etc. As illustrated in FIG. 6, the vibration sensor(s) 634 can be positioned on the motor housing 412. However, disclosed example are not limited thereto. Rather, the vibration sensor(s) 634 can be positioned in any suitable location that enables the controller 628 to determine vibration(s) caused by the shaft 434.

The controller 628 compares the vibration obtained from the vibration sensor 634 to an example vibration threshold (e.g., limit) to determine whether the vibration level satisfies (e.g., exceeds, etc.) the vibration threshold. In some examples, the vibration threshold is based on design of the thermal management system 300, the pump 400 and components therein, expected operating conditions, etc. The vibration satisfying the vibration threshold can be indicative of a hot condition or a cold condition. In response to detecting a threshold condition, the controller 628 is structured to cause the inert gas to enter the secondary flow network 522 by sending an output signal the valve(s) 612, 624 representing a position of the core, as discussed above. Further, the controller 628 continues to monitor a vibration sensor 634 and, in response to determining the vibration level no longer satisfies the threshold condition, sends an output signal to the valve(s) 612, 624 to occlude the inert gas.

In some examples, the controller 628 operates the valve(s) 612, 624 based on a speed of the shaft 434 (e.g., measured by the rotation sensor 635 of FIG. 6). The controller 628 can obtain a speed of the shaft 434 from the rotation sensor 635 and compare the speed to one or more threshold speeds that are indicative of a hot condition or a cold condition. For example, the controller 628 can compare the speed of the shaft 434 to an example lower speed threshold (e.g., limit) to determine whether the rotational speed of the shaft 434 satisfies (e.g., exceeds, is slower than, etc.) the lower speed threshold (e.g., indicative of a cold condition). In some examples, the lower speed threshold is based on a design of the thermal management system 300, the pump 400 and components therein, expected operating conditions, etc. Further, the controller 628 can compare the speed of the shaft 434 to an example upper speed threshold (e.g., limit) to determine whether the rotational speed of the shaft 434 satisfies (e.g., exceeds, is faster than, etc.) the upper speed threshold (e.g., indicative of a hot condition). In some examples, the upper speed threshold is based on a design of the thermal management system 300, the pump 400 and components therein, expected operating conditions, etc.

In response to detecting a threshold condition, the controller 628 can cause the inert gas to enter the secondary flow network 522 by sending an output signal to the valve(s) 612, 624 representing a position of the core, as discussed above. Further, the controller 628 can continue to monitor the speed sensor and, in response to determining the rotational speed of the shaft 434 no longer satisfies the threshold condition, can send an output signal to the valve(s) 612, 624 to occlude the inert gas.

In some examples, the controller 628 can measure or monitor multiple parameters at the same time. The controller 628 may utilize one or more of these parameters to determine when to determine whether to allow the inert gas to flow through the secondary flow network 522.

The pump 400 facilitates the flow of (e.g., drives) the $CO_2$ through a first closed-loop circuit (e.g., a first closed-loop system, etc.) corresponding to a thermal transport system (e.g., the thermal management system 300 of FIG. 3) via the thermal transport bus 302 to add/remove heat from accessory components. In other words, the thermal management system 300 and/or the components corresponding thereto (e.g., the thermal transport bus 302, the pump 304, the heat source heat exchanger(s) 306, the heat sink heat exchanger(s) 308, the conduit(s) 310, the heat source valve(s) 312, and/or the heat sink valve(s) 314 of FIG. 3) implement the primary flow network. Further, the pump 400 facilitates the flow of the $CO_2$ through a second closed-loop circuit 636 (e.g., a second closed-loop system, etc.) corresponding to a lubricant transport system via the lubricant transport bus 462 to provide the working fluid to rotating components housed in the pump 400. In some examples, the pump 400 facilitates the flow of the $CO_2$ through a third closed-loop circuit 638 (e.g., a third closed-loop system, etc.) corresponding to an inert gas transport system via the gas transport bus 606 to provide an inert gas to the working fluid driven through the load bearing components housed in the pump 400. In some examples, the pump 400 facilitates the flow of an immiscible fluid through a fourth closed-loop circuit 640 corresponding to the second and third closed-loop circuits to provide an immiscible fluid to the rotating components housed in the pump 400.

In some examples, the addition of the inert gas to the secondary flow network 522 provides an advantage over other matter, such as oil, because inert gas does not deteriorate like oil and can be maintained clean in a closed loop for longer duration.

While FIG. 6 is described in the context of the example thermal transport bus pump 400 of FIG. 4, it should be understood that aspects of the example bearing lubrication system 600 can be applied other types of fluid pumps, such as a canned motor pump(s), a magnetically driven pump(s), a multi-stage pump(s), a circulator pump(s), a cantilevered pump(s), a rotodynamic pump(s), etc.

In some examples, the thermal transport bus pump 400 and/or the bearing lubrication system 600 include(s) means for transporting a working fluid from the compressor collector 408 of the pump 400 to a secondary inlet 422 of the pump 400. For example, the means for transporting a working fluid can be implemented by the lubricant transport bus 462.

In some examples, the thermal transport bus pump 400 and/or the bearing lubrication system 600 include(s) means for transporting an inert gas. For example, the means for transporting the inert gas can be implemented by the gas transport bus 606.

In some examples, the thermal transport bus pump 400 and/or the bearing lubrication system 600 include(s) means for separating an immiscible media. For example, the means for separating the immiscible media can be implemented by the separator 614.

In some examples, the thermal transport bus pump 400 includes means for housing a fluid. For example, the means for housing may be implemented by the compressor collector 408, the forward bearing housing 424 (FIG. 4), and/or the backplate 428 (FIG. 4).

In some examples, the thermal transport bus pump 400 includes means for compressing the fluid. For example, the means for compressing the fluid may be implemented by the impeller 406.

In some examples, the thermal transport bus pump 400 includes means for transporting the fluid to a primary flow network. For example, the means for transporting the fluid to a primary flow network may be implemented by the thermal transport bus 302.

In some examples, the thermal transport bus pump 400 includes means for transporting the fluid to a secondary flow network 522. For example, the means for transporting the fluid to a secondary flow network may be implemented by the lubricant transport bus 462.

Figure 7:
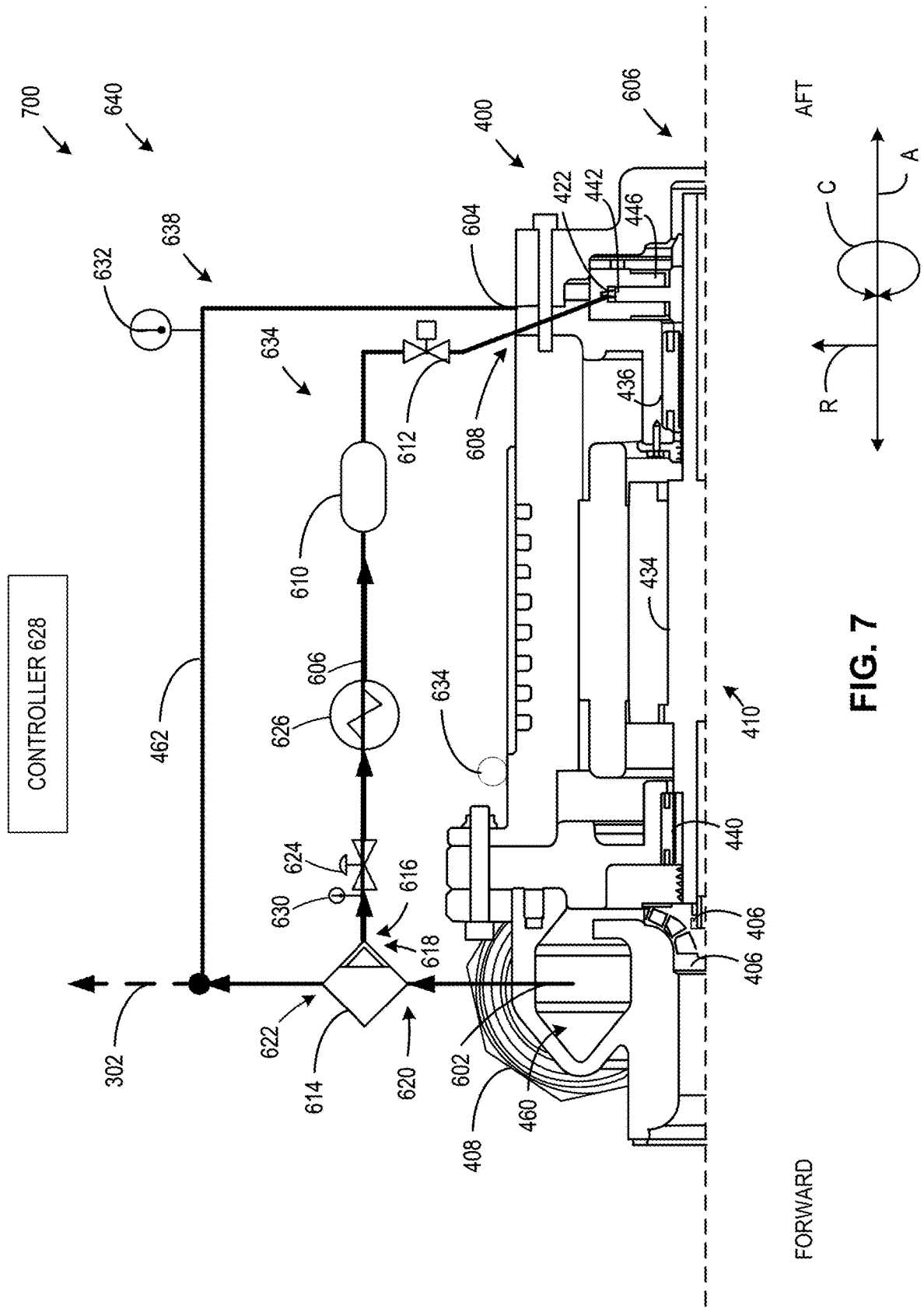
FIG. 7 is a schematic illustration of another example bearing lubrication system configured in accordance with teachings of this disclosure for providing a lubricant(s) to load bearing components in a pump.

FIG. 7 is a schematic illustration of another example bearing lubrication system 700 that can be implemented in connection with the pump 400. Those components of the bearing lubrication system 700 that are substantially similar or identical to the components of the bearing lubrication system 600 disclosed above in connection with FIG. 6 and/or the pump 400 of FIG. 3-6 and that have structure and/or functions substantially similar or identical to the structure and/or functions of those components will not be described in detail again below. Instead, the interested reader is referred to the above corresponding descriptions. To facilitate this process, the same reference numbers are used for like structures.

The bearing lubrication system 700 is substantially the same as the bearing lubrication system 600 disclosed in connection with FIG. 6. However, in the bearing lubrication system 700 of FIG. 7, gas transport bus 606 is configured to inject the inert gas directly into a bearing portion of the pump 400. In particular, the downstream end 608 of the gas transport bus 606 is fluidly coupled to the secondary inlet 422 and/or another inlet that leads to a hydrodynamic bearing (e.g., a foil bearing 436, 440, 442, 446) housing in the pump 400.

The controller 628 can operate substantially the same as disclosed in connection with the bearing lubrication system 600 to operate the device(s) to inject or occlude the inert gas based on one or more measured parameters (e.g., temperature, vibration, speed, etc.).

Figure 8:
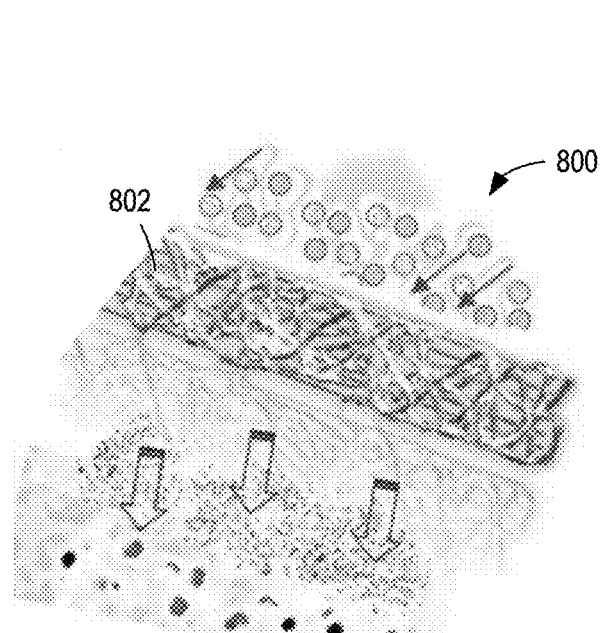
FIG. 8 illustrates an example separator.

FIG. 8 illustrates an example separator 800 that can be used to implement the separator 614 of the bearing lubrication system(s) 600, 700 of FIGS. 6 and 7. The separator 800 is a graphene-membrane separator that includes a graphene membrane 802. Generally, separation in membranes occurs as a result of differences in transport properties of the substances flowing therethrough. The graphene membrane 802 is structured to allow a first substance to pass through the membrane, but occlude a second substance from passing through the membrane.

Figure 9:
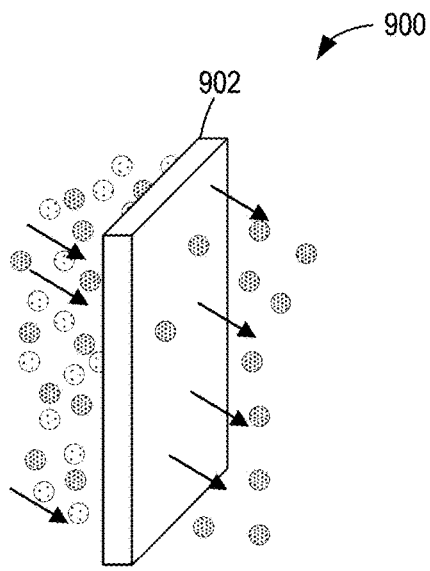
FIG. 9 illustrates another example separator.

FIG. 9 illustrates another example separator 900 that can be used to implement the separator 614 of the bearing lubrication system(s) 600, 700 of FIGS. 6 and 7. The separator 900 is a membrane that includes a polymer-based membrane 902. In this example, the polymer-based membrane 902 is a polymeric membrane having selectivity and permeability attributes. The polymer-based membrane 902 is structured to allow a first substance to pass through the membrane, but occlude a second substance from passing through the membrane. Typically an inert gas is associated with permeability coefficient, which is a product of its diffusion coefficient and its solubility constant. The polymer-based membrane 902 includes pores (not illustrated in FIG. 9), and separation is based on particle sizes of the inert gas and of the fluid. Performance of the separator 900 is at least partially dependent on a permeability of the polymer-based membrane 902. To achieve desired selectivity, the pores 904 on the membrane need to be relatively smaller than the particles in the mixture.

Figure 10:
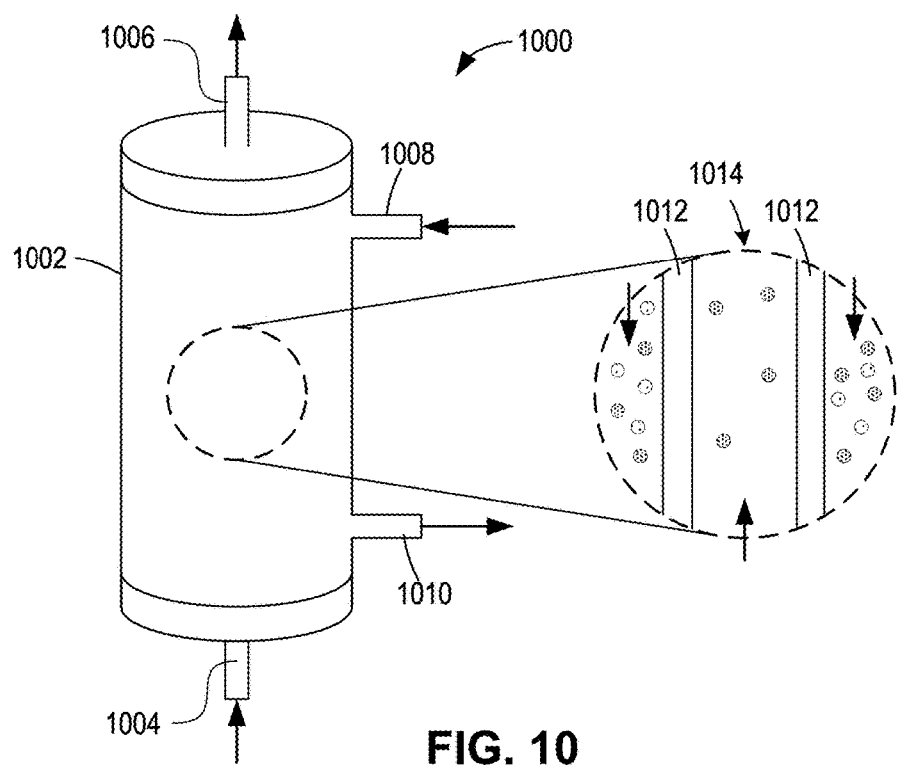
FIG. 10 illustrates yet another example separator.

FIG. 10 illustrates yet another example separator 1000 that can be used to implement the separator 614 of the bearing lubrication system(s) 600, 700 of FIGS. 6 and 7. The separator 1000 includes an example housing 1002, which includes an absorbent inlet 1004, an absorbent outlet 1006, a gas inlet 1008, and a gas outlet 1010. Within its housing 1002, the separator 1000 includes an example microporous membrane 1012 (e.g., nanoporous membrane), which is an annular membrane surrounding a channel 1014. The separator 1000 is a type of immiscible gas separator that can be used to separate the inert gas and the working fluid.

While examples disclosed herein discuss different example separators 614, 800, 900, 1000, the examples disclosed herein are not limited thereto. Rather, the separator 614 can include other types of separator(s) and/or membrane(s), such as perovskite membranes, metal-organic frameworks (MOFs), silica membranes, etc. Further, the separator 614 can include one or more membranes of similar or different structure. In particular, the separator 614 can include one or more membranes that allow a particular gas species in the immiscible mixture to permeate freely through the membrane while hindering permeation of other species.

Figure 11:
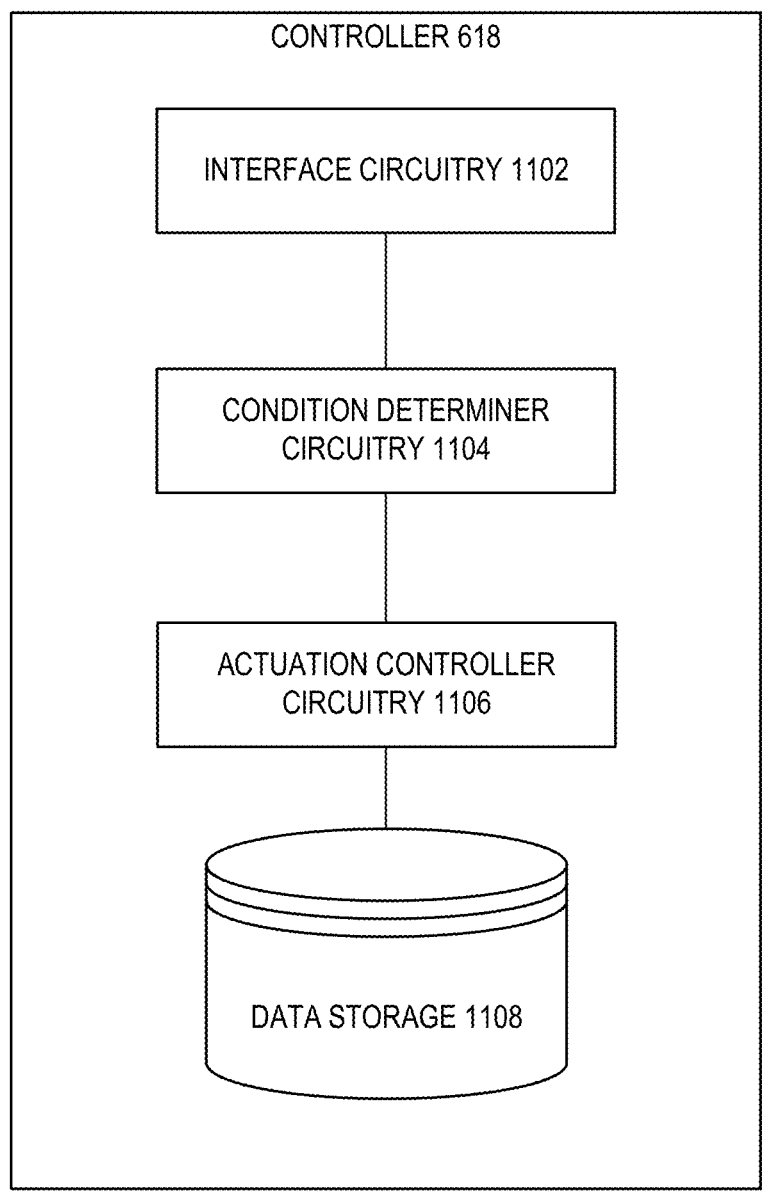
FIG. 11 is a block diagram of an example controller system used in the example pump(s) of FIGS. 4, 5, 6, and/or 7.

FIG. 11 is a block diagram of an example implementation of a control system used in the example thermal transport bus pump of FIG. 2. The controller 628 of FIG. 11 may be instantiated (e.g., creating an instance of, bring into being for any length of time, materialize, implement, etc.) by programmable circuitry such as a Central Processor Unit (CPU) executing first instructions. Additionally or alternatively, the controller 628 of FIG. 11 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 11 may, thus, be instantiated at the same or different times. Some or all of the circuitry of FIG. 11 may be instantiated, for example, in one or more threads executing concurrently on hardware and/or in series on hardware. Moreover, in some examples, some or all of the circuitry of FIG. 11 may be implemented by microprocessor circuitry executing instructions and/or FPGA circuitry performing operations to implement one or more virtual machines and/or containers.

The controller 628 illustrated in FIG. 11 includes example interface circuitry 1102, which is structured to facilitate communication with other components of the bearing lubrication system 600, 700 of FIGS. 6 and 7. As disclosed above, the bearing lubrication system 600 can include one or more sensors (e.g., temperature sensors, vibration sensors pressure sensors, speed sensors, etc.) to measure and/or monitor one or more parameters (e.g., temperature of a fluid, speed of a shaft 434 (FIGS. 4-7), vibration level of a component, etc.) of the pump system. For example, the controller 628 can be communicatively coupled to one or more sensors 632, 634 (FIGS. 6 and 7) that measure an operating parameter(s) the fluid, the pump 400 (FIGS. 4-7), and/or the motor 410 (FIG. 4), indicative of an operating condition (e.g., a hot condition or a cold condition) of the pump system. The interface circuitry 1102 receives the sensor data (e.g., signals) from the one or more sensors 632, 634, enabling the controller 628 to determine the operating condition.

The controller 628 illustrated in FIG. 11 includes example condition determiner circuitry 1104 to obtain data (e.g., sensor measurements) from the one or more sensors 632, 634 and to determine an operating condition of the pump system. In particular, the condition determiner circuitry 1104 can compare the data to threshold data to determine whether a measurement value satisfies a corresponding threshold. In some examples, the condition determiner circuitry 1104 is instantiated by processor circuitry executing condition determiner instructions and/or configured to perform operations such as those represented by the flowchart of FIG. 12.

The condition determiner circuitry 1104 compares the measured values of the parameter(s) obtained from the sensor(s) 632, 634 to one or more thresholds or threshold ranges. If a parameter satisfies (e.g., exceeds) a threshold, for example, the controller 628 operates the bearing lubrication system 600 to inject an inert gas into the secondary flow network 522 (FIG. 5). When the parameter does not satisfy the threshold, the controller 628 operates the bearing lubrication system 600 to occlude flow through the gas transport bus 606 (FIGS. 6 and 7). Therefore, the controller 628 uses one or more parameters to determine when to inject the inert gas.

In some examples, the parameter is temperature (e.g., an operating temperature measurement or value) of the fluid (e.g., $CO_2$). The condition determiner circuitry 1104 obtains the temperature measurement and compares the temperature measurement to an upper temperature threshold (e.g., approximately 300° F.). When the temperature of the fluid satisfies the upper temperature threshold (e.g., the temperature of the fluid exceeds the upper temperature threshold), the condition determiner circuitry 1104 determines to add inert gas to the fluid. The condition determiner circuitry 1104 also compares the temperature measurement to a lower temperature threshold (e.g., approximately 150° F.). When the temperature of the fluid satisfies the lower temperature threshold (e.g., the temperature of the fluid is below the lower temperature threshold), the condition determiner circuitry 1104 determines to add inert gas to the fluid.

When the condition determiner circuitry 1104 determines that the temperature measurement is within a range defined by the lower temperature threshold and the upper temperature threshold, the condition determiner circuitry 1104 determines not to add the inert gas to the fluid. In other words, when the temperature measurement is at or below the upper temperature threshold and at or above the lower temperature threshold, the condition determiner circuitry 1104 determines that the fluid is at a desired operating temperature. In such instances, the condition determiner circuitry 1104 determines to occlude the inert gas from flowing through the gas transport bus 606 and mixing with the fluid.

In additional or alternative examples, the parameter is vibration (e.g., a vibration level or value) corresponding to the pump 400 (e.g., a housing, a component therein, etc.). The condition determiner circuitry 1104 obtains the vibration value and compares the vibration value to vibration threshold. When the vibration value satisfies the vibration threshold (e.g., the vibration value indicates that the pump 400 of the fluid exceeds the upper temperature threshold), the condition determiner circuitry 1104 determines to add inert gas to the fluid.

The controller 628 of FIG. 11 includes example actuation control circuitry 1106, which is structured to control one or more components of the bearing lubrication system 600. The actuation control circuitry 1106 of FIG. 11 is structured to control a position of a valve 612, 624 based on the operating condition. In some examples, the actuation control circuitry 1106 can control another components of the pump system, such as the heat exchanger 626, etc.

When the condition determiner circuitry 1104 determines, processes, and/or verifies that a parameter(s) (e.g., temperature, vibration level, speeds, etc.) satisfies a corresponding threshold(s), the condition determiner circuitry 1104 can send a signal to the actuation control circuitry 1106 to adjust a position of the valve(s) 612, 624 to allow inert gas to enter the secondary flow network 522. Alternatively, when the condition determiner circuitry 1104 determines that the parameter(s) (e.g., temperature, vibration level, speeds, etc.) satisfies a corresponding threshold(s), the condition determiner circuitry 1104 can send a signal to the actuation control circuitry 1106 to adjust a position of the valve(s) 612, 624 to occlude flow of the inert gas to prevent the inert gas from entering enter the secondary flow network 522.

More specifically, the actuation control circuitry 1106 receives signals indicating a desired valve position and/or a desired output pressure from the condition determiner circuitry 1104, determines a current state of the valve(s) 612, 624, and causes the position of the valve(s) 612, 624 to change based on the received signals and the current positions. In some examples, the actuation control circuitry 1106 is instantiated by processor circuitry executing actuation control instructions and/or configured to perform operations such as those represented by the flowchart of FIG. 12. In some examples, the actuation control circuitry 1106 is configured as a closed loop controller that receives positional feedback and/or output pressure feedback from the valve(s) 612, 624 and continues to send output signals that cause actuation of a stopper (e.g., plunger, gate, ball, globe, etc.) until the actuation control circuitry 1106 determines that the output pressure is set to the proper value and/or the stopper is at the proper position.

The controller 628 of FIG. 11 includes example data storage 1108 to store data (e.g., sensor measurements, thresholds, current operating conditions, etc.) or any information associated with the interface circuitry 1102, the condition determiner circuitry 1104, and/or the actuation control circuitry 1106. The example data storage 1108 can be implemented by any memory, storage device and/or storage disc for storing data, such as flash memory, magnetic media, optical media, etc. Furthermore, the data stored in the example data storage 1108 can be in any data format such as binary data, comma delimited data, tab delimited data, structured query language (SQL) structures, image data, etc.

While an example manner of implementing the controller 628 of FIGS. 6-7 is illustrated in FIG. 11, one or more of the elements, processes, and/or devices illustrated in FIG. 11 may be combined, divided, re-arranged, omitted, eliminated, and/or implemented in any other way. Further, the example interface circuitry 1102, the example condition determiner circuitry 1104, the example actuation control circuitry 1106, and/or, more generally, the example controller 628 of FIG. 11, may be implemented by hardware alone or by hardware in combination with software and/or firmware. Thus, for example, any of the example interface circuitry 1102, the example condition determiner circuitry 1104, the actuation control circuitry 1106, and/or, more generally, the example controller 628, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example controller 628 of FIG. 11 may include one or more elements, processes, and/or devices in addition to, or instead of, those illustrated in FIG. 11, and/or may include more than one of any or all of the illustrated elements, processes and devices.

Figure 12:
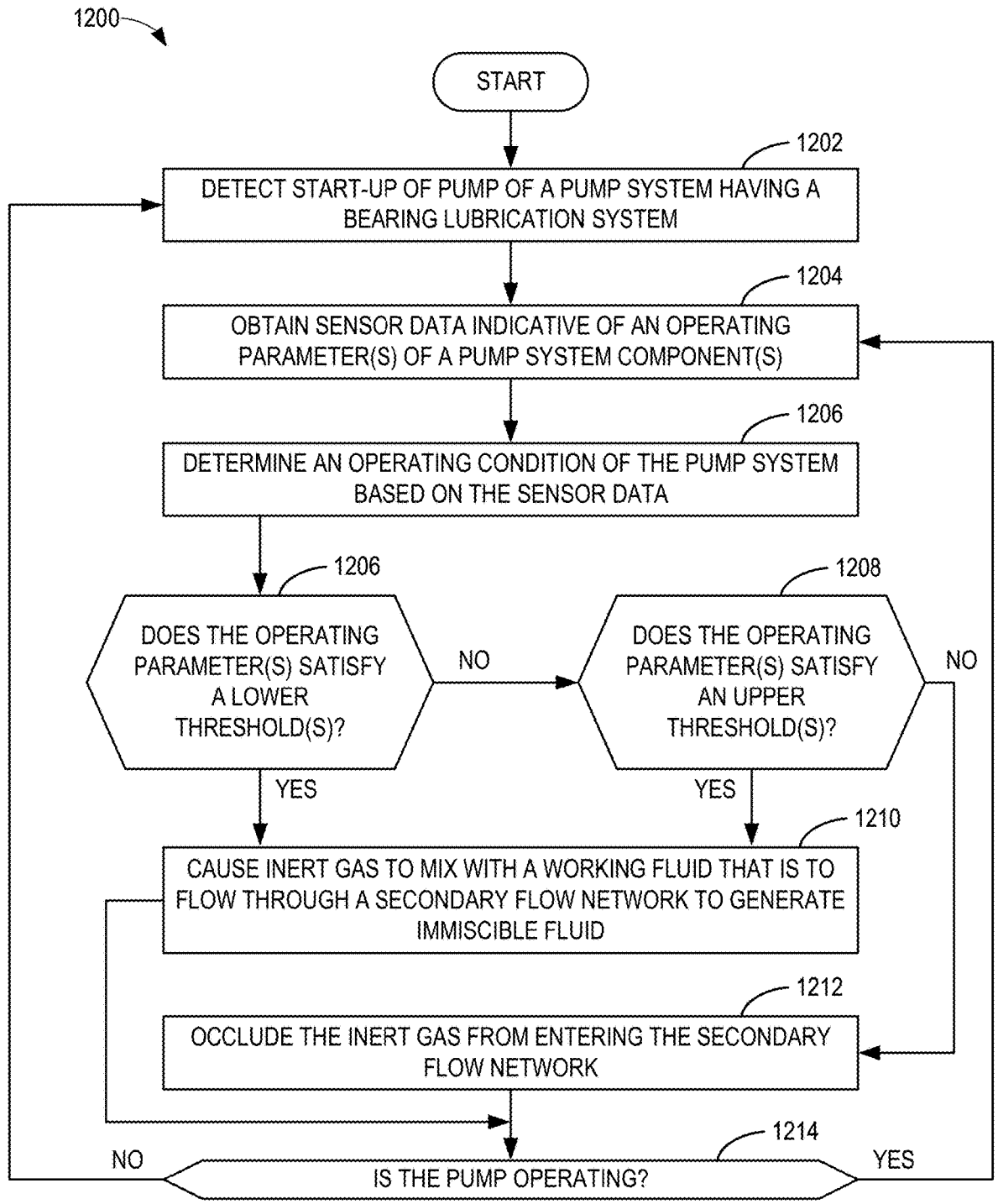
FIG. 12 is a flowchart representative of example machine readable instructions and/or example operations that can be executed by example processor circuitry to implement the example control system of FIG. 11.

A flowchart representative of example machine readable instructions, which may be executed by programmable circuitry to implement and/or instantiate the controller 628 of FIG. 11 and/or representative of example operations which may be performed by programmable circuitry to implement and/or instantiate the controller 628 of FIG. 11, is shown in FIG. 12. The machine readable instructions may be one or more executable programs or portion(s) of one or more executable programs for execution by programmable circuitry such as the programmable circuitry 1312 shown in the example processor platform 1300 discussed below in connection with FIG. 13 and/or may be one or more function(s) or portion(s) of functions to be performed by an example programmable circuitry (e.g., an FPGA). In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIG. 12, many other methods of implementing the example controller 628 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s). The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 12 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 12 is a flowchart representative of example machine readable instructions and/or example operations 1200 that may be executed, instantiated, and/or performed by programmable circuitry to control a lubricant(s) provided to load bearing components in a secondary flow network of a pump. The example machine-readable instructions and/or the example operations 1200 of FIG. 12 begin at block 1202, at which example condition determiner circuitry (e.g., condition determiner circuitry 1104 of FIG. 11) detects start-up of a pump (e.g., pump 400 of FIGS. 3-7) of a pump system having a bearing lubrication system (e.g., bearing lubrication system 600, 700 of FIGS. 6 and/or 7). For example, the condition determiner circuitry 1104 can obtain a signal from a speed sensor identifying rotation of the shaft 434 and/or in another manner that indicative of rotation of the shaft 434.

At block 1204, the interface circuitry 1102 obtains sensor data indicative of an operating parameter(s) of a component(s) of the pump system. For example, the interface circuitry 1102 can obtain a signal from a fluid sensor 632 (FIGS. 6 and 7), a vibration sensor 634 (FIGS. 6 and 7), a speed sensor, a pressure sensor, etc. that includes a value(s) associated with the parameter(s). While the following description describes the parameter(s) being a temperature of the fluid, examples disclosed herein are not limited thereto. Rather, the parameter(s) can include additional or alternative parameters indicative of an operating condition of the pump system relative to hydrodynamic bearings (e.g., foil bearings 436, 440, 442, 446) (FIGS. 4-7) housed in the pump 400.

At block 1206, the condition determiner circuitry 1104 determines an operating condition of the pump system based on the sensor data. In particular, the condition determiner circuitry 1104 compares the parameter(s) to one or more thresholds. For example, the parameter(s) can be one or more of a temperature of the fluid, a vibration level (e.g., of the shaft 434, etc.), a speed of the shaft 434, etc. When the parameter(s) includes the temperature of the fluid, for example, the condition determiner circuitry 1104 can compare a temperature value to an upper temperature threshold and/or a lower temperature threshold.

At block 1206, the condition determiner circuitry 1104 determines whether the parameter(s) satisfies a lower threshold. For example, the condition determiner circuitry 1104 determines whether the parameter(s) satisfies the lower temperature threshold. When the parameter(s) satisfies the lower threshold (e.g., block 1206=YES), control advances to block 1210. On the other hand, when the parameter(s) fails to satisfy the lower threshold (e.g., block 1206=NO), the process advances to block 1208.

At block 1208, the condition determiner circuitry 1104 determines whether the parameter(s) satisfies an upper threshold. For example, the condition determiner circuitry 1104 determines whether the parameter(s) satisfies the upper temperature threshold. When the parameter(s) satisfies the upper threshold (e.g., block 1208=YES), control advances to block 1210. However, when the parameter(s) fails to satisfy the upper threshold (e.g., block 1208=NO), control advances to block 1212.

At block 1210, example actuation control circuitry (e.g., actuation control circuitry 1106) causes an inert gas to mix with a working fluid that is to flow through a secondary flow network 522 to generate an immiscible fluid. That is, in response to determining that the temperature of the fluid satisfies the upper temperature threshold or the lower temperature threshold, the controller 628 actuates the third closed-loop circuit 638. More specifically, the actuation control circuitry 1106 receives signals indicating a desired valve position from the condition determine circuitry 1104, determines a current state of a valve(s) 612, 624 fluidly coupled to the gas transport bus 606, and causes a position of the valve(s) 612, 624 to change based on the received signals and the current positions. The process then advances to block 1214.

At block 1212, the actuation control circuitry 1106 occludes the inert gas from entering the secondary flow network 522. More specifically, the actuation control circuitry 1106 receives signals indicating a desired valve position from the condition determine circuitry 1104, determines a current state of a valve(s) 612, 624 fluidly coupled to the gas transport bus 606, and causes a position of the valve(s) 612, 624 to change based on the received signals and the current positions. The process then advances to block 1214.

At block 1214, the controller 628 determines if the pump 400 is operating. For example, the pump 400 can determine if the shaft 434 is rotating, etc. When the pump 400 is operating, the process returns to block 1204 at which the interface circuitry 1102 obtains sensor data. When the pump 400 is not operating, the process returns to block 1202 at which the condition determiner circuitry 1104 detects start-up of the pump 400.

Figure 13:
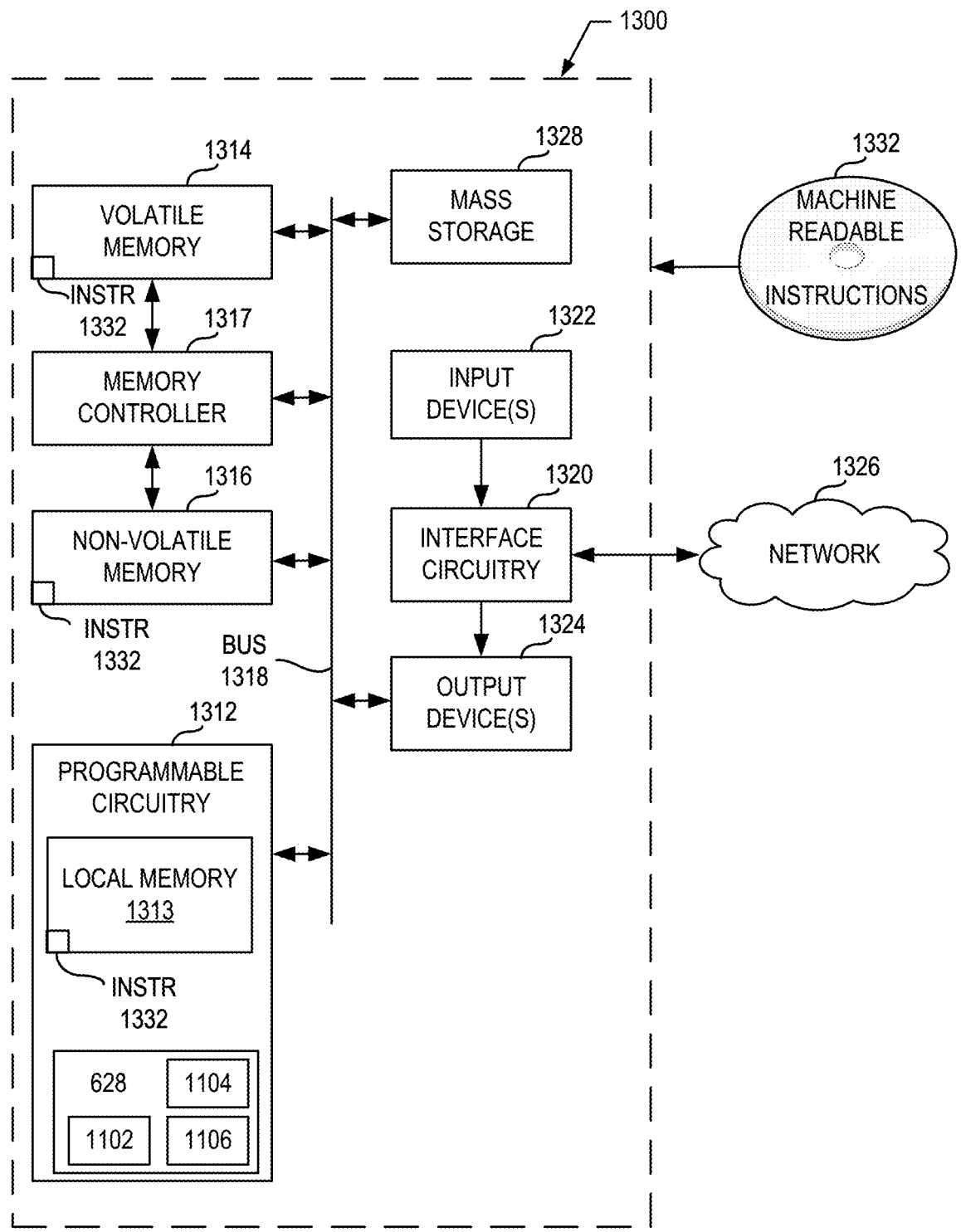
FIG. 13 is a block diagram of an example processing platform including processor circuitry structured to execute the example machine readable instructions and/or the example operations of FIG. 12 to implement the example control system of FIG. 11.

FIG. 13 is a block diagram of an example programmable circuitry platform 1300 structured to execute and/or instantiate the example machine-readable instructions and/or the example operations of FIG. 12 to implement the controller 628 of FIG. 11. The programmable circuitry platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1300 of the illustrated example includes programmable circuitry 1312. The programmable circuitry 1312 of the illustrated example is hardware. For example, the programmable circuitry 1312 can be implemented by one or more integrated circuits, logic circuits, FPGAs, microprocessors, CPUs, GPUs, DSPs, and/or microcontrollers from any desired family or manufacturer. The programmable circuitry 1312 may be implemented by one or more semiconductor based (e.g., silicon based) devices. In this example, the programmable circuitry 1312 implements example interface circuitry 1102, example condition determiner circuitry 1104, example actuation control circuitry 1106, and/or, more generally, the example controller 628.

The programmable circuitry 1312 of the illustrated example includes a local memory 1313 (e.g., a cache, registers, etc.). The programmable circuitry 1312 of the illustrated example is in communication with main memory, which includes a volatile memory 1314 and a non-volatile memory 1316, by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory of the illustrated example is controlled by a memory controller 1317. In some examples, the memory controller 1317 may be implemented by one or more integrated circuits, logic circuits, microcontrollers from any desired family or manufacturer, or any other type of circuitry to manage the flow of data going to and from the main memory 1313.

The programmable circuitry platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user (e.g., a human user, a machine user, etc.) to enter data and/or commands into the programmable circuitry 1312. The input device(s) 1322 can be implemented by, for example, a sensor, an audio sensor, a microphone, a camera (still or video), a keyboard, a button, a mouse, a touchscreen, a trackpad, a trackball, an isopoint device, and/or a voice recognition system.

One or more output devices 1324 are also connected to the interface circuitry 1320 of the illustrated example. The output device(s) 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1300 of the illustrated example also includes one or more mass storage discs or devices 1328 to store firmware, software, and/or data. Examples of such mass storage discs or devices 1328 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

Machine readable instructions 1332, which may be implemented by the machine readable instructions of FIG. 12, may be stored in the mass storage device 1328, in the volatile memory 1314, in the non-volatile memory 1316, and/or on at least one non-transitory computer readable storage medium such as a CD or DVD which may be removable.

From the foregoing, it will be appreciated that example methods, systems, and apparatus have been disclosed that facilitate control of a lubricant(s) provided to a load bearing component in a pump (e.g., a centrifugal pump). As the pump operates, a portion of a working fluid (e.g., $sCO_2$) can be siphoned (e.g., tapped) from the pump and driven to load bearing components in the pump to provide a lubricating film. During operation, an impeller/expeller of the pump can cause the working fluid to flow forward into a fluid conduit, and through an outlet to provide a continuous flow of the working fluid to the load bearing components. However, an operating condition of the working fluid can fluctuate during operation, causing hot and/or cold conditions that lead to vibrations, wear, etc. Example bearing lubrication systems disclosed herein monitor a temperature of a working fluid and/or another parameter associated with a pump system (e.g., a vibration level(s), a speed (e.g., of a shaft, etc.), a pressure, etc.) to determine whether to actuate a valve to add an inert gas to the working fluid to produce an immiscible fluid mixture. Example bearing lubrication systems disclosed herein mix an inert gas with the working fluid to form an immiscible fluid mixture (e.g., inert gas/working fluid mixture) to be driven through the load bearing components.

Example bearing lubrication systems disclosed herein can improve foil bearing performance by adjusting a temperature, a critical pressure, a viscosity, and/or a density of the working fluid. The immiscible fluid mixture maintains the working fluid in gaseous form (e.g., avoid liquid $CO_2$ during low-speed conditions) by reducing a critical pressure of the working fluid at a given temperature. The immiscible fluid mixture maintains the working fluid below a threshold temperature(s) to increase performance of the load bearing component(s). Examples disclosed herein enable foil bearings housing in a fluid pump to reduce (e.g., inhibit, dampen, etc.) axial movements of a shaft, reduce friction, improve performance of a pump, and reduce wear of components therein.

The foregoing examples of the pumps can be used with thermal transport systems. Although each example pump or pump system disclosed above has certain features, it should be understood that it is not necessary for a particular feature of one example pump or pump system to be used exclusively with that example. Instead, any of the features described above and/or depicted in the drawings can be combined with any of the examples, in addition to or in substitution for any of the other features of the examples. Features of one example are not mutually exclusive to features of another example. Instead, the scope of this disclosure encompasses any combination of any of the features.

Example methods, apparatus, systems, and articles of manufacture to pressurize fluid in closed loop systems are disclosed herein. Further aspects of the present disclosure are provided by the subject matter of the following clauses.

A closed-loop system to provide a lubricant to a fluid pump, the system comprising a lubrication flow network disposed within the fluid pump; a sensor fluidly coupled to the fluid pump to measure a condition of a fluid that flows through the lubrication flow network; a first transport bus fluidly coupled to the lubrication flow network, the first transport bus to transport an inert gas; a valve fluidly coupled to the first transport bus; a controller to transmit signals to the valve based on the condition of the fluid to cause the valve to open or close; and a separator fluidly coupled between an outlet of the fluid pump and the first transport bus, the separator to separate the fluid and the inert gas.

The system of the preceding clause, wherein the sensor is a temperature sensor and the condition is a temperature of the fluid, the sensor is to transmit a signal to the controller indicative of an operating temperature of the fluid.

The system of any preceding clause, wherein the controller is to actuate the valve to cause the inert gas to enter the fluid pump when the temperature of the fluid satisfies a threshold temperature.

The system of any preceding clause, wherein the threshold temperature is an upper operating temperature of a bearing housing in the fluid pump, the lubrication flow network in fluid communication with the bearing.

The system of any preceding clause, wherein the fluid is supercritical carbon dioxide ($sCO_2$), and wherein the threshold temperature is approximately 300 degrees Fahrenheit.

The system of any preceding clause, wherein the fluid is carbon dioxide, and wherein the threshold temperature corresponds to a temperature at which the carbon dioxide includes liquid carbon dioxide.

The system of any preceding clause, wherein the sensor is an accelerometer and the condition is vibration, the sensor is to transmit a signal to the controller indicative of an operating vibration level of a component housed in the fluid pump.

The system of any preceding clause, wherein the sensor is a rotation sensor coupled to a shaft, and the condition is speed, the sensor is to transmit a signal to the controller indicative of an operating speed of a shaft housed in the fluid pump.

The system of any preceding clause, further including a second transport bus fluidly coupled between the separator and an inlet corresponding to the lubrication flow network, the second transport bus to transport the fluid.

The system of any preceding clause, further including a heat exchanger coupled to the first transport bus, the heat exchanger to remove heat from the inert gas that exits the separator.

The system of any preceding clause, wherein the inert gas includes at least one of helium, krypton, argon, xenon, or dinitrogen.

A fluid pump to pressurize a fluid in a closed-loop circuit, the fluid pump comprising a primary inlet fluidly coupled to a primary flow network; a secondary inlet fluidly coupled to a secondary flow network; a first flowline fluidly coupled to the secondary inlet, the first flowline to transport a portion of the fluid to the secondary flow network; a second flowline fluidly coupled to the secondary flow network to transport an inert gas to the secondary flow network; a valve fluidly coupled to the second flowline; a controller communicatively coupled to the valve to direct the inert gas to the secondary flow network based on sensor data from a sensor, the sensor data indicative of a condition of the fluid; and a separator fluidly coupled to the first flowline and the second flowline, the separator to cause the inert gas to separate from the fluid and re-enter the second flowline, the separator positioned adjacent a pump outlet.

The fluid pump of any preceding clause, wherein the first flowline is fluidly coupled between the secondary inlet of the fluid pump and at least one of the pump outlet, a primary inlet of the fluid pump, or a third flowline, the third flowline being fluidly coupled between the primary inlet of the fluid pump and the pump outlet.

The fluid pump of any preceding clause, wherein the second flowline is fluidly coupled between the pump outlet and the secondary inlet of the fluid pump.

The fluid pump of any preceding clause, wherein the second flowline is fluidly coupled between the pump outlet and a third inlet of the fluid pump, the third inlet leading to the secondary flow network.

The fluid pump of any preceding clause, wherein the secondary flow network defines a flowpath through the fluid pump to provide a lubricant to a foil bearing housed in the fluid pump, the lubricant including one of (a) the portion of the fluid or (b) the portion of the fluid and the inert gas.

The fluid pump of any preceding clause, wherein the separator includes at least one of a graphene membrane, a polymeric membrane, or a nanoporous membrane.

The fluid pump of any preceding clause, further including a chamber fluidly coupled to the second flowline, the chamber to store at least a portion of the inert gas.

An apparatus comprising interface circuitry; machine readable instructions; and programmable circuitry to at least one of instantiate or execute the machine readable instructions to monitor sensor data from a sensor, the sensor data indicative of a condition of fluid that is to enter a secondary flow network housed in a pump that drives at least some of the fluid through a primary flow network; determine, based on the sensor data, whether to inject an inert gas into the secondary flow network; and in response to determining to inject the inert gas into the secondary flow network, actuate a valve fluidly coupled to a flowline housing the inert gas.

The apparatus of any preceding clause, wherein the sensor data includes a temperature of the fluid, and wherein the programmable circuitry determines to inject the inert gas into the secondary flow network when the temperature is indicative of a cold condition.

The apparatus of any preceding clause, wherein the cold condition is indicative of liquid being present in the fluid.

The apparatus of any preceding clause, wherein the sensor data includes a temperature of the fluid, and wherein the programmable circuitry determines to inject the inert gas into the secondary flow network when the temperature is indicative of a hot condition.

The apparatus of any preceding clause, wherein the hot condition is indicative that the temperature of the fluid exceeds an upper operating temperature of a component to which the secondary flow network provides the fluid.

The apparatus of any preceding clause, wherein the valve is an expansion valve, and the programmable circuitry is to actuate the expansion valve to open by transmitting a signal to the expansion valve.

A pump system for pressurizing a fluid in closed loop system, comprising means for compressing the fluid, the means for compressing the fluid to drive the fluid through the pump system; means for transporting the fluid fluidly coupled to the means for compressing the fluid; means for transporting an inert gas fluidly coupled to the means for compressing the fluid; means for controlling a flow of the inert gas; and means for separating to separate the fluid and the inert gas, the means for separating positioned adjacent an outlet of the means for compressing the fluid.

It is noted that this patent claims priority from Indian Patent Application Number 202311049205, which was filed on Jul. 21, 2023, and is hereby incorporated by reference in its entirety.

The following claims are hereby incorporated into this Detailed Description by this reference, with each claim standing on its own as a separate embodiment of the present disclosure. Although certain example methods, systems, and apparatus have been disclosed herein, the scope of coverage of this patent is not limited thereto. On the contrary, this patent covers all methods, systems, and apparatus, fairly falling within the scope of the claims of this patent.

What is claimed is:

1. A closed-loop system to provide a lubricant to a fluid pump, the system comprising:
   a lubrication flow network disposed within the fluid pump;
   a sensor fluidly coupled to the fluid pump to measure a condition of a fluid that flows through the lubrication flow network;
   a first transport bus fluidly coupled to the lubrication flow network, the first transport bus to transport an inert gas;
   a valve fluidly coupled to the first transport bus;
   a controller to transmit signals to the valve based on the condition of the fluid to cause the valve to open or close; and
   a separator fluidly coupled between an outlet of the fluid pump and the first transport bus, the separator to separate the fluid and the inert gas.

2. The system of claim 1, wherein the sensor is a temperature sensor and the condition is a temperature of the fluid, the sensor is to transmit a signal to the controller indicative of an operating temperature of the fluid.

3. The system of claim 2, wherein the controller is to actuate the valve to cause the inert gas to enter the fluid pump when the temperature of the fluid satisfies a threshold temperature.

4. The system of claim 3, wherein the threshold temperature is an upper operating temperature of a bearing housing in the fluid pump, the lubrication flow network in fluid communication with the bearing.

5. The system of claim 3, wherein the fluid is supercritical carbon dioxide (sCO$_2$), and wherein the threshold temperature is approximately 300 degrees Fahrenheit.

6. The system of claim 3, wherein the fluid is carbon dioxide, and wherein the threshold temperature corresponds to a temperature at which the carbon dioxide includes liquid carbon dioxide.

7. The system of claim 1, wherein the sensor is an accelerometer and the condition is vibration, the sensor is to transmit a signal to the controller indicative of an operating vibration level of a component housed in the fluid pump.

8. The system of claim 1, wherein the sensor is a rotation sensor coupled to a shaft, and the condition is speed, the sensor is to transmit a signal to the controller indicative of an operating speed of a shaft housed in the fluid pump.

9. The system of claim 1, further including a second transport bus fluidly coupled between the separator and an inlet corresponding to the lubrication flow network, the second transport bus to transport the fluid.

10. The system of claim 1, further including a heat exchanger coupled to the first transport bus, the heat exchanger to remove heat from the inert gas that exits the separator.

11. The system of claim 1, wherein the inert gas includes at least one of helium, krypton, argon, xenon, or dinitrogen.

12. A fluid pump to pressurize a fluid in a closed-loop circuit, the fluid pump comprising:
   a primary inlet fluidly coupled to a primary flow network;
   a secondary inlet fluidly coupled to a secondary flow network;
   a first flowline fluidly coupled to the secondary inlet, the first flowline to transport a portion of the fluid to the secondary flow network;
   a second flowline fluidly coupled to the secondary flow network to transport an inert gas to the secondary flow network;
   a valve fluidly coupled to the second flowline;
   a controller communicatively coupled to the valve to direct the inert gas to the secondary flow network based on sensor data from a sensor, the sensor data indicative of a condition of the fluid; and
   a separator fluidly coupled to the first flowline and the second flowline, the separator to cause the inert gas to separate from the fluid and re-enter the second flowline, the separator positioned adjacent a pump outlet.

13. The fluid pump of claim 12, wherein the first flowline is fluidly coupled between the secondary inlet of the fluid pump and at least one of the pump outlet, a primary inlet of the fluid pump, or a third flowline, the third flowline being fluidly coupled between the primary inlet of the fluid pump and the pump outlet.

14. The fluid pump of claim 12, wherein the second flowline is fluidly coupled between the pump outlet and the secondary inlet of the fluid pump.

15. The fluid pump of claim 12, wherein the second flowline is fluidly coupled between the pump outlet and a third inlet of the fluid pump, the third inlet leading to the secondary flow network.

16. The fluid pump of claim 12, wherein the secondary flow network defines a flowpath through the fluid pump to provide a lubricant to a foil bearing housed in the fluid pump, the lubricant including one of (a) the portion of the fluid or (b) the portion of the fluid and the inert gas.

17. The fluid pump of claim 12, wherein the separator includes at least one of a graphene membrane, a polymeric membrane, or a nanoporous membrane.

18. The fluid pump of claim 12, further including a chamber fluidly coupled to the second flowline, the chamber to store at least a portion of the inert gas.

19. An apparatus comprising:
   interface circuitry;
   machine readable instructions; and
   programmable circuitry to at least one of instantiate or execute the machine readable instructions to:
      monitor sensor data from a sensor, the sensor data indicative of a condition of fluid that flows through a secondary flow network housed in a pump that drives at least some of the fluid through a primary flow network;
      determine, based on the sensor data, whether to inject an inert gas into the secondary flow network; and
      in response to determining to inject the inert gas into the secondary flow network, actuate a valve fluidly coupled to a flowline housing the inert gas.

20. The apparatus of claim 19, wherein the sensor data includes a temperature of the fluid, and wherein the programmable circuitry determines to inject the inert gas into the secondary flow network when the temperature is indicative of a cold condition.

* * * * *